US011953721B2

(12) United States Patent
Cho et al.

(10) Patent No.: US 11,953,721 B2
(45) Date of Patent: Apr. 9, 2024

(54) PHOTONIC SYSTEM INCLUDING MICRO RING MODULATOR AND METHOD OF USING

(71) Applicant: TAIWAN SEMICONDUCTOR MANUFACTURING COMPANY, LTD., Hsinchu (TW)

(72) Inventors: Lan-Chou Cho, Hsinchu (TW); Stefan Rusu, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 24 days.

(21) Appl. No.: 17/841,656

(22) Filed: Jun. 15, 2022

(65) Prior Publication Data

US 2023/0408762 A1 Dec. 21, 2023

(51) Int. Cl.
*G02B 6/12* (2006.01)
*G02B 6/136* (2006.01)

(52) U.S. Cl.
CPC ......... *G02B 6/12004* (2013.01); *G02B 6/136* (2013.01); *G02B 2006/12135* (2013.01); *G02B 2006/12142* (2013.01); *G02B 2006/12176* (2013.01)

(58) Field of Classification Search
CPC ............ G02B 6/29335; G02B 6/29338; G02B 6/29341; G02B 2006/12135; G02F 1/0147; G02F 2203/15
See application file for complete search history.

(56) References Cited

U.S. PATENT DOCUMENTS

| | | | | |
|---|---|---|---|---|
| 9,274,353 | B1 * | 3/2016 | Dong | G02F 1/0147 |
| 9,612,458 | B1 * | 4/2017 | Lentine | G02F 1/025 |
| 9,880,352 | B2 * | 1/2018 | Florjanczyk | G02B 6/131 |
| 10,197,730 | B1 * | 2/2019 | Ngu | G02B 6/12002 |
| 10,871,663 | B2 * | 12/2020 | Le Maitre | H01L 31/035281 |
| 2014/0110572 | A1 * | 4/2014 | Li | G02F 1/025 |
| | | | | 250/227.23 |
| 2015/0192803 | A1 * | 7/2015 | Lee | G02F 1/011 |
| | | | | 385/2 |
| 2016/0356959 | A1 * | 12/2016 | Jayatilleka | G02B 6/12007 |
| 2020/0041431 | A1 * | 2/2020 | Herman | G01N 25/68 |
| 2023/0096775 | A1 * | 3/2023 | Nedovic | G02F 1/0147 |
| | | | | 385/40 |

FOREIGN PATENT DOCUMENTS

JP 2016152360 A * 8/2016

* cited by examiner

*Primary Examiner* — Ryan A Lepisto
*Assistant Examiner* — Erin D Chiem
(74) *Attorney, Agent, or Firm* — Hauptman Ham, LLP

(57) ABSTRACT

A photonic system includes a waveguide. The photonic system further includes a micro ring modulator (MRM) spaced from the waveguide. The photonic system further includes a heater configured to increase a temperature of the MRM in response to the heater receiving a first voltage. The photonic system further includes a cooling element configured to decrease a temperature of the MRM in response to the cooling element receiving a second voltage.

10 Claims, 14 Drawing Sheets

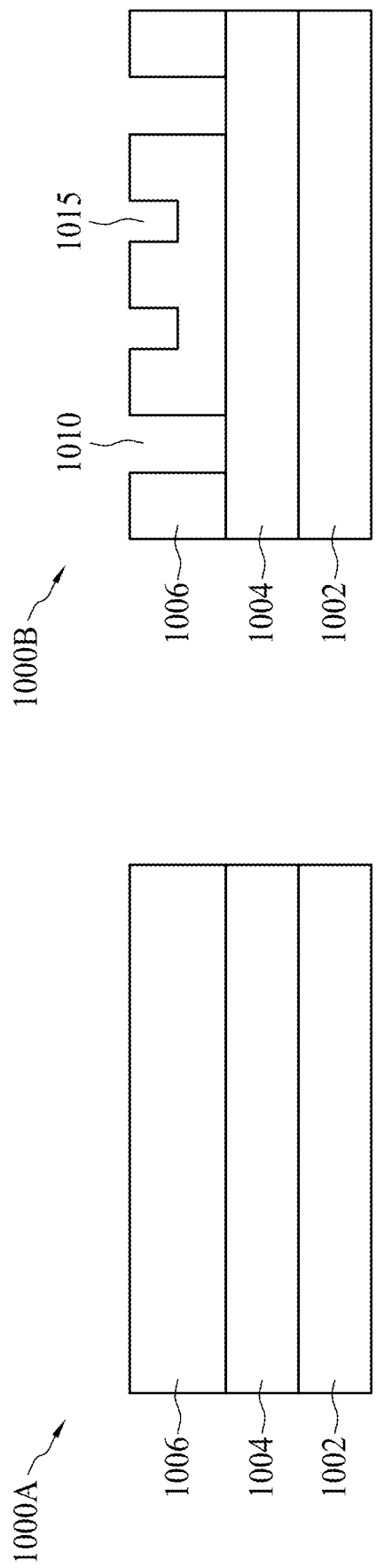

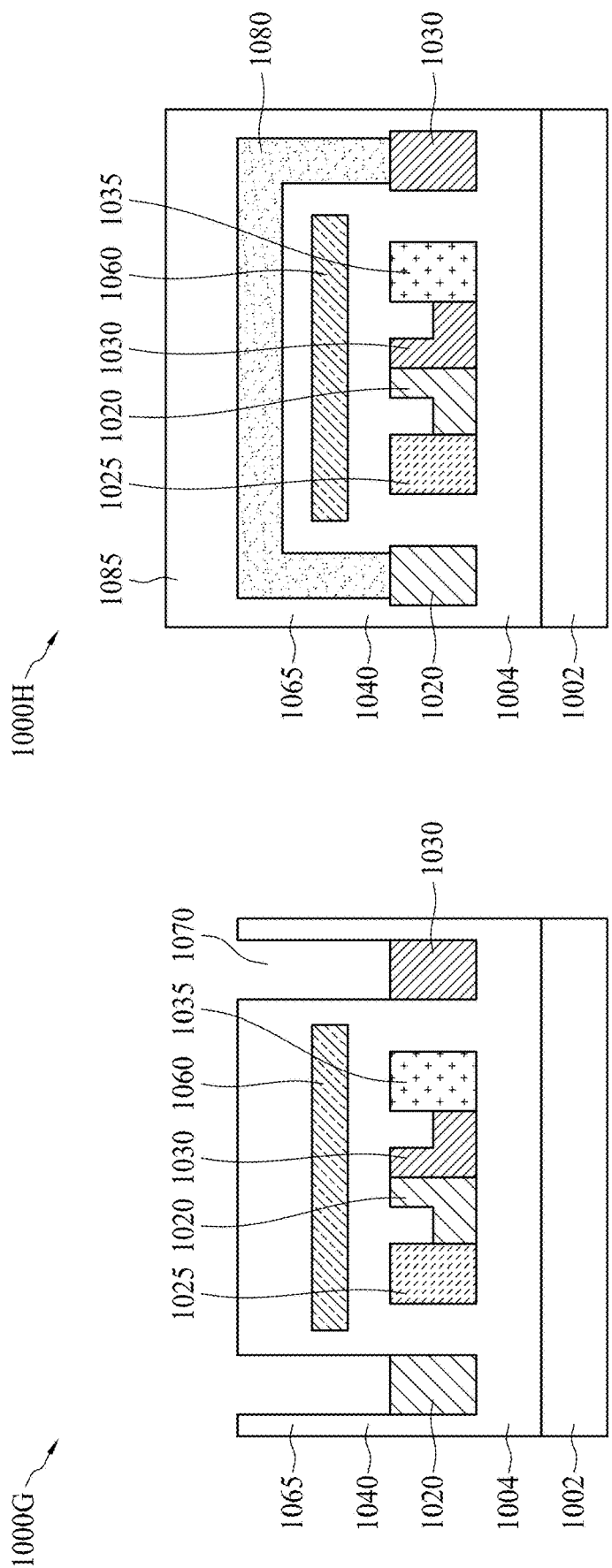

PHOTONIC SYSTEM INCLUDING MICRO RING MODULATOR AND METHOD OF USING

BACKGROUND

Micro ring modulators (MRMs) are used in optical systems to couple optical signals into and out of waveguides in photonic systems. Semiconductor photonics, e.g., silicon photonics, is based on manipulating the thermo-optic effect exhibited by a semiconductor material. A material which exhibits a thermo-optic effect (TOE) changes refractive index in response to changes in temperature. MRMs are usable for filtering optical signals, coupling optical signals between optical waveguides, and other purposes in photonic systems. The MRM is located near an optical waveguide and is configured to optically couple with the optical waveguide to allow light of a specific wavelength to be coupled between the MRM and the optical waveguide. In some approaches, a heater is used to adjust a refractive index of the MRM in order to either enhance optical coupling between the MRM and the optical waveguide or reduce optical coupling between the MRM and the optical waveguide. The adjustment of the optical coupling allows the MRM to selectively perform functions, such as filtering, within a photonic system.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 10A-10H are cross-sectional views of a portion of a photonic system including an MRM at various stages of manufacturing, in accordance with some embodiments.

DETAILED DESCRIPTION

Figure 1:
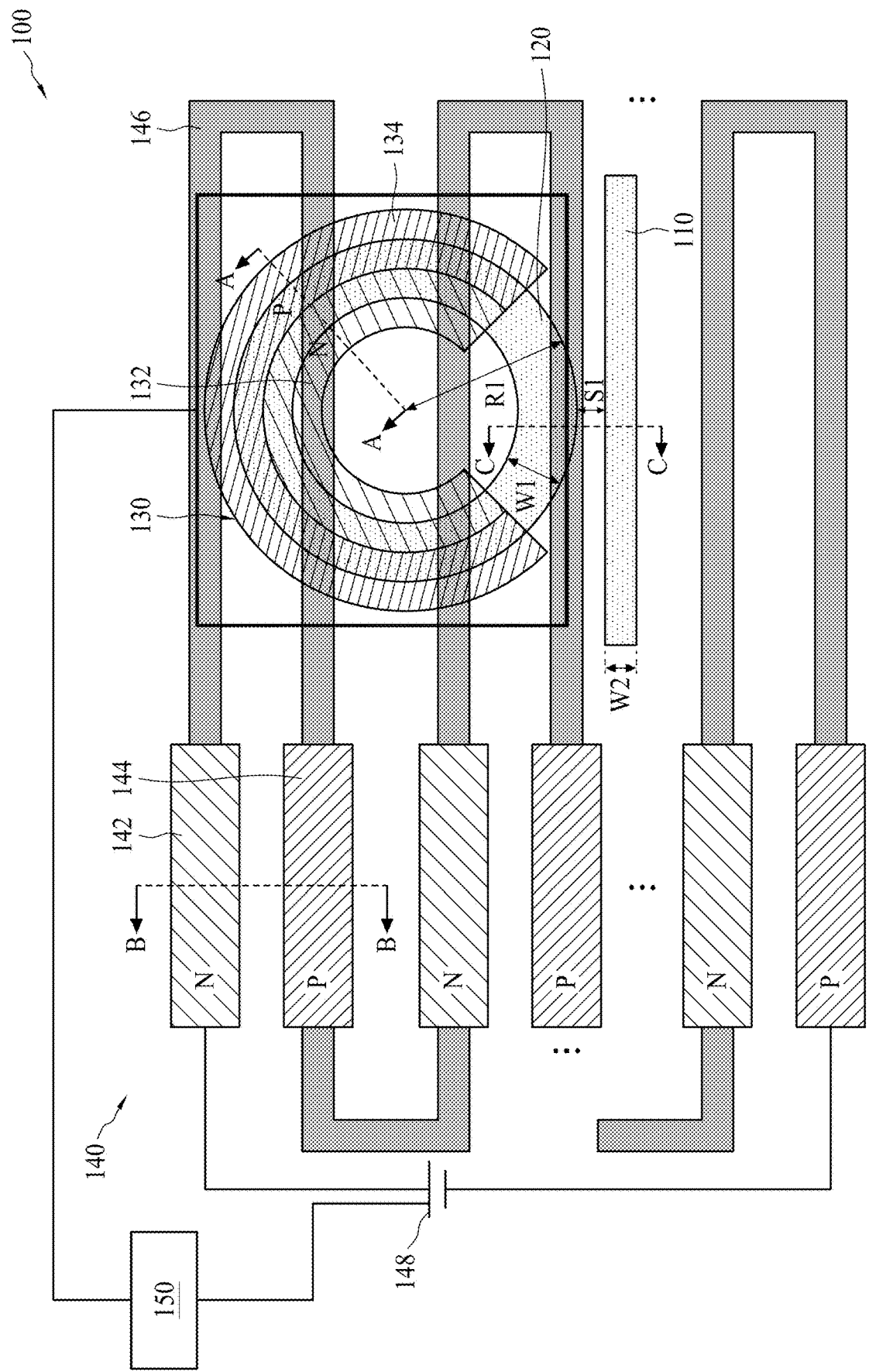
FIG. 1 is a top view of a photonic system including a micro ring modulator (MRM), in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Micro ring modulators (MRMs) are usable to implement numerous functions within a photonic system, such as filtering and coupling. In order for an MRM to effectively implement the designed functionality within the photonic system, the MRM is in resonance with a wavelength of light. As photonic systems become more complex, a width of a waveband acceptable for coupling a desired signal wavelength becomes narrower due to an increased number of optical signals, each of having a distinct wavelength, propagating with the photonic system. Due to the high sensitivity of a refractive index of MRMs to manufacturing processes, MRMs often do not resonant with the designed signal wavelength or have low resonance with the desired signal wavelength.

In some approaches, a heater is used to change a temperature of the MRM in order to adjust the refractive index of the MRM in order to adjust the resonance with the desired wavelength. However, heaters are only able to adjust refractive index of the MRM in a single direction. That is, the refractive index of the MRM increases as the temperature increases. In a situation where the refractive index of the MRM is slightly above a target refractive index, the heater would heat the MRM to a next refractive index that is capable of resonating with the desired wavelength. MRM resonance for target wavelengths occurs at repeated wavelength periods, called the free spectral range (FSR). In some instances, the FSR is approximately 7 nanometers (nm). That is, for example, an MRM will resonate with green light at a wavelength of approximately 1306 nm and again at a wavelength of approximately 1313 nm. If the refractive index of the MRM following a manufacturing process is only slightly above a designed refractive index for resonating with a desired signal wavelength, the heater would be used to heat the MRM in order to target the next wavelength in the FSR for the desired signal wavelength.

In some instances, the MRM has a temperature coefficient of 0.07 nm/° C., meaning that the shift in the resonant wavelength for the MRM changes by 0.07 nm for each degree Celsius the MRM is heated. Assuming an FSR of approximately 7 nm, a heater would be used to heat the MRM by nearly 100° C. in some instances. This level of significant heating consumes a large amount of power for operating the MRM. As power consumption increases battery life decreases. Prolonging battery life is a significant goal of many devices, especially in portable devices such as mobile phones. Further, prolonged exposure to heating of nearly 100° C. eventually damages the MRM in some embodiments.

In order to help reduce power consumption and to reduce an amount of heating applied to an MRM, the current disclosure includes both a heating component and a cooling component. The cooling component is usable to adjust the refractive index of the MRM in an opposite manner from the heating component. Therefore, in a situation where the refractive index of the MRM is slight above a target refractive index due to manufacturing processes, the cooling component is able to lower the refractive index of the MRM to resonant with the desired signal wavelength. Being able to both lower and raise the refractive index of the MRM helps to reduce power consumption as well as prolonging the useful life of the MRM in comparison with photonic systems that include only the heating component.

FIG. 1 is a top view of a photonic system 100 including an MRM 120 in accordance with some embodiments. The photonic system 100 includes a waveguide 110 configured to carry at least one optical signal. The photonic system 100 further includes the MRM 120 located proximate to the waveguide 110. The MRM 120 is configured to couple with the waveguide 110 to add an optical signal to the waveguide 110 or remove an optical signal from the waveguide 110. The photonic system 100 further includes a heater 130 configured to raise a temperature of the MRM 120. The heater 130 includes a first doped region 132 having a first dopant type; and a second doped region 134 having a second dopant type opposite the first dopant type. The heater 130 further includes a conductive element (shown in FIG. 2), configured to supply a voltage to one of the first doped region 132 or the second doped region 134 to control a temperature of the MRM 120. The photonic system 100 further includes a cooling element 140 configured to lower a temperature of the MRM 120. The cooling element 140 includes a plurality of first doped regions 142 having the first dopant type; and a plurality of second doped regions 144 having the second dopant type. The cooling element 140 further includes a plurality of conductive elements 146 electrically connecting the first doped regions 142 and the second doped regions 144. At least some of the plurality of conductive elements 146 extend over the MRM 120. The cooling element 140 further includes a power source 148 for supplying power to the plurality of first doped regions 142 and the plurality of second doped regions 144 to control the temperature of the MRM 120. The photonic system 100 is capable of both heating the MRM 120 and cooling the MRM 120 in order to facilitate optical coupling between the MRM 120 and the waveguide 110. In comparison with other approaches that do not include both the heater 130 and the cooling element 140, the photonic system 100 is able to reduce power consumption and increase useful life of the MRM 120. The photonic system 100 further includes a controller 150 configured to control the heater 130 and the cooling element 140 in order to adjust a temperature of the MRM 120.

The waveguide 110 includes a core including an optically transparent material and is configured to permit propagation of an optical signal along the waveguide 110. In some embodiments, the core of the waveguide 110 includes silicon. In some embodiments, the core of the waveguide 110 includes polymer, glass, silicon nitride or another suitable material. A cladding material surrounds the core. The cladding material has a different refractive index from the core in order to help reduce an amount of signal loss as the optical signal propagates along the waveguide 110. In some embodiments, the cladding has a lower refractive index than the core. In some embodiments, the cladding material is silicon oxide, polymer, or another suitable material. In some embodiments, the waveguide 110 has a circular cross-section. In some embodiments, the waveguide 110 has a rectangular cross-section, a triangular cross-section, or another suitable cross-sectional shape. In some embodiments, a width W2 of the waveguide 110 ranges from about 0.01 μm to about 10 μm. If the width W2 of the waveguide 110 is too small, a risk of optical signal loss due to an increased number of reflections during propagation increases, in some instances. If the width W2 of the waveguide 110 is too large, an overall size of the photonic system 100 increases without an appreciable increase in performance, in some instances.

The MRM 120 is configured to selectively couple the optical signal into or out of the waveguide 110. The MRM 120 is positioned close to, but not in contact with, the waveguide. A size of a spacing S1 between the MRM 120 and the waveguide 110 determines the coupling efficiency between the MRM 120 and the waveguide 110. In some embodiments, a spacing S1 between the MRM 120 and the waveguide 110 ranges from about 0.01 microns (μm) to about 10 μm. If the spacing S1 is too small a risk of unintentional leakage from the waveguide 110 into the MRM 120 increases, in some instances. If the spacing S1 is too large coupling of the optical signal between the waveguide 110 and the MRM 120 is inefficient and a high signal loss results, in some instances. In addition to the spacing S1, optical properties, such as refractive index, also impact coupling efficiency. Light coupled from the waveguide 110 into the MRM 120 travels in a direction counter to a propagation direction of the optical signal in the waveguide 110. The light intensifies due to constructive interference within the MRM 120. The light is then able to be coupled from the MRM 120 into another waveguide, e.g., as in FIG. 7, or into another optical component.

Materials and cross-sectional shape of the MRM 120 are similar to the waveguide 110. In some embodiments, a core material of the MRM 120 is a same material as the core material for the waveguide 110. In some embodiments, the core material of the MRM 120 is different from the core material of the waveguide 110. In some embodiments, a cladding material of the MRM 120 is a same material as the cladding material for the waveguide 110. In some embodiments, the cladding material of the MRM 120 is different from the cladding material of the waveguide 110. In some embodiments, the cladding material of the MRM 120 is continuous with the cladding material the waveguide 110.

In some embodiments, the MRM 120 is on a same plane, i.e., a same distance from a substrate, as the waveguide 110. In some embodiments, the MRM 120 is closer to the substrate than the waveguide 110. In some embodiments, the MRM 120 is farther from the substrate than the waveguide 110. In some embodiments, the MRM 120 overlaps the waveguide 110 in a plan view. In situations where the MRM 120 is on a different plane from the waveguide 110, the vertical separation is also included in determining the spacing S1.

In some embodiments, the MRM 120 is a ring structure. In some embodiments, the MRM 120 includes reflective gratings within to adjust a direction of propagation of light within the MRM 120, e.g., to change counter-clockwise propagation to clockwise propagation. In some embodiments, a radius R1 the MRM 120 ranges from about 1 μm to about 30 μm. If the radius R1 of the MRM 120 is too small, signal loss increases as a result of a number of reflections as the optical signal propagates through the MRM 120, in some instances. If the radius R1 of the MRM 120 is too large, an overall size of the photonic system 100 increases without an appreciable increase in performance, in some instances.

In some embodiments, a width W1 of the MRM 120 ranges from about 0.01 μm to about 10 μm. If the width W1 of the MRM 120 is too small, signal loss within the MRM 120 due to increases reflections increases, in some instances. IF the width W1 of the MRM 120 is too large, an overall size of the photonic system 100 increases without an appreciable increase in performance, in some instances. In some embodiments, the width W1 of the MRM 120 is equal to the width W2 of the waveguide 110. In some embodiments, the width W1 of the MRM 120 is different from the width W2 of the waveguide 110.

The heater 130 includes the first doped region 132 and the second doped region 134 proximate the MRM 120. The heater 130 further includes a conductive element, e.g., as in FIG. 2, configured to supply a voltage to the first doped region 132 or the second doped region 134. Based on a resistance of a current flowing through the first doped region 132 and the second doped region 134 due to a voltage provided from the conductive element, heat is generated for raising a temperature of the MRM. In some embodiments, at least one of the first doped region 132 or the second doped region 134 is in direct contact with the MRM 120. In some embodiments, at least one of the first doped region 132 or the second doped region 134 is spaced from the MRM 120. In some embodiments, a dopant concentration of the first doped region 132 ranges from about $1e^{17}$ dopants/cm$^3$ to about $1e^{19}$ dopants/cm$^3$. If the dopant concentration of the first doped region 132 is too large, then the resistance in the first doped region 132 does not generate sufficient heat for adjusting the temperature of the MRM 120, in some instances. If the dopant concentration of the first doped region 132 is too small, then power consumption by the heater 130 increases, in some instances. In some embodiments, a dopant concentration of the second doped region 134 ranges from about $1e^{17}$ dopants/cm$^3$ to about $1e^{19}$ dopants/cm$^3$. If the dopant concentration of the second doped region 134 is too large, then the resistance in the second doped region 134 does not generate sufficient heat for adjusting the temperature of the MRM 120, in some instances. If the dopant concentration of the second doped region 134 is too small, then power consumption by the heater 130 increases, in some instances. In some embodiments, the dopant concentration of the first doped region 132 is equal to the dopant concentration of the second doped region 134. In some embodiments, the dopant concentration of the first doped region 132 is different from the dopant concentration of the second doped region 134.

The cooling element 140 includes the plurality of first doped regions 142 and the plurality of second doped regions 144 arranged in an alternating pattern of first doped regions 142 and second doped regions 144. Each group of a first doped region 142 and a second doped region 144 is electrically connected in series with a next group of a first doped region 142 and a second doped region 144. Further, a top thermal conductive plate (not shown) extends over a top of the plurality of first doped regions 142 and the plurality of second doped regions 144; and a bottom thermal conductive plate (not show) extends below the plurality of first doped regions 142 and the plurality of second doped regions 144. An electrical insulating material electrically insulates each of the top thermal conductive plate and the bottom thermal conductive plate from the plurality of first doped regions 142 and the plurality of second doped regions 144. The electrical insulating material reduces a risk of short circuiting across the alternating first doped regions 142 and the second doped regions 144 in situations where at least one of the top thermal conductive plate or the bottom thermal conductive plate is also electrically conductive. In some embodiments, the top thermal conductive plate and the bottom thermal conductive plate independently include copper, tungsten, polymer, or another suitable thermally conductive material. In some embodiments, the electrical insulating material includes alumina, silicon oxide, silicon nitride, or another suitable electrically insulating material.

In operation, based on a direction of current through the plurality of first doped regions 142 and the plurality of second doped regions 144, one of the top thermal conductive plate or the bottom thermal conductive plate will absorb heat, i.e., a cool side. The other of the top thermal conductive plate or the bottom thermal conductive plate will reject heat, i.e., a hot side. By passing the current through the plurality of first doped regions 142 and the plurality of second doped regions 144 in a specified direction, the cooling element 140 is able to reduce the temperature of the MRM 120.

The cooling element 140 further includes conductive elements 146 which are used to electrically connect the alternating first doped regions 142 and second doped regions 144. The conductive elements 146 are also cooled during operation of the cooling element 140. As a result, the conductive elements 146 are also usable to absorb heat from the MRM 120 in order to reduce the temperature of the MRM 120.

The cooling element 140 further includes a power source 148 configured to provide the current to the plurality of first doped regions 142 and the plurality of second doped regions 144. In some embodiments, the power source 148 includes a battery of a device including the photonic system 100; and the power supplied to the cooling element 140 is controlled by a switch, either analog or digital, between the battery and the cooling element 140.

The controller 150 is configured to actively control the heater 130 and the cooling element 140 in order to adjust the temperature of the MRM 120. Adjusting the temperature of the MRM 120 impacts coupling between the MRM 120 and the waveguide 110.

In some embodiments, the controller is configured to receive information from one or more photodetectors (not shown) in order to determine whether the optical signal is being efficiently coupled between the waveguide 110 and the MRM 120. In response to a determination that the optical signal is inefficiently coupled, the controller 150 controls either the cooling element 140 or the heater 130 to adjust the temperature of the MRM 120 to increase coupling. One of ordinary skill in the art would also understand that the temperature of the MRM 120 is controllable to selectively reduce coupling with the waveguide 110 based on a designed functionality of the photonic system 100.

In addition to controlling coupling during operation, the controller 150 is also usable to tune the MRM 120 prior to normal operation. As noted above, the MRM 120 is sensitive to processing and optical properties of the MRM 120 are altered during processing subsequent to formation of the MRM 120, in some instances. As a result, coupling between the components will be different than an initial design in some instances. The controller 150 is configured to control the heater 130 and the cooling element 140 in order to determine maximum and minimum coupling values by measuring efficiency of converting optical signals to electrical signals from the at least one photodetector. In some embodiments, the tuning is re-performed periodically to account for variations in the performance of the MRM 120 over time.

In comparison with other approaches, the photonic system 100 is able to control the temperature of the MRM 120 in both a heating direction and a cooling direction. The ability to control the temperature of the MRM 120 in both direction helps to adjust the refractive index of the MRM 120 to couple to an FSR of the target wavelength closest to the inherent refractive index of the MRM 120 following manufacturing processes. As discussed above, the MRM 120 is sensitive to the manufacturing processes. As a result, being able to tune the MRM 120 in both the heating direction and the cooling direction helps to reduce power consumption by the photonic system 100 in comparison with other approaches that only include one direction of tuning, e.g., heating. In addition, subjecting the MRM 120 to a lower temperature variation by being able to tune toward the closest FSR helps to prolong the useful life of the MRM 120 in comparison with other approaches that are only able to tune in a single direction.

Figure 2:
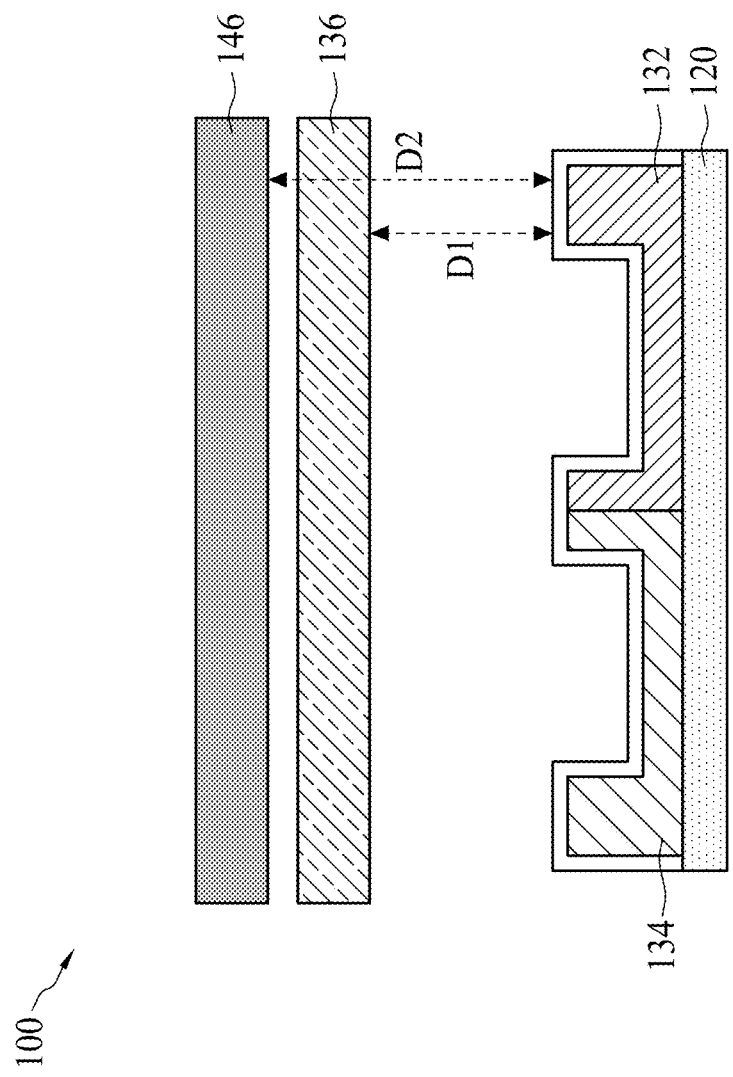
FIG. 2 is a cross-sectional view of a portion of a photonic system including an MRM, in accordance with some embodiments.

FIG. 2 is a cross-sectional view of the photonic system 100 including the MRM 120 in accordance with some embodiments. The cross-sectional view of FIG. 2 is taken along line A-A of FIG. 1. Similar elements in FIG. 2 have a same reference number as in FIG. 1. The photonic system 100 includes the MRM 120 formed integrally with the first doped region 132 and the second doped region 134. In some embodiments, the MRM 120 is spaced from at least one of the first doped region 132 or the second doped region 134. A heater conductive element 136 is over the first doped region 132 and the second doped region 134. The heater conductive element 136 is configured to provide a voltage to the first doped region 132 or the second doped region 134 in order to heat the MRM 120. Additionally, resistance within the heater conductive element 136 is also able to provide additional heating to the MRM 120 in order to help minimize power consumption during heating of the MRM 120. The conductive element 146 is over the heater conductive element 136. As discussed above, the conductive element 146 is part of the cooling element 140 and is usable to cool the MRM 120.

The photonic system 100 includes the heater conductive element 136 being closer to the MRM 120 than the conductive element 146. In some embodiments, the conductive element 146 is closer to the MRM 120 than the heater conductive element 136. For example, in some embodiments, a position of the heater conductive element 136 and a position of the conductive element 146 are reversed from the arrangement in FIG. 2. In some embodiments, the conductive element 146 is on a same plane as the heater conductive element 136. That is, both the conductive element 146 and the heater conductive element 136 are a same distance from the MRM 120; and the conductive element 146 is offset from the heater conductive element 136 in a direction into the page for FIG. 2. In some embodiments, a distance D1 from the first doped region 132 to the heater conductive element 136 is less than 10 µm. In some embodiments, the heater conductive element 136 directly contacts the first doped region 132 or the second doped region 134. If the heater conductive element 136 is too far from the first doped region 132, then heating of the MRM 120 is inefficient and power consumption is increased in some instances. In some embodiments, a distance D2 from the first doped region 132 to the conductive element 146 is less than 10 µm. In some embodiments, the conductive element 146 directly contacts the first doped region 132 or the second doped region 134. If the conductive element 146 is too far from the first doped region 132, then cooling of the MRM 120 is inefficient and power consumption is increased in some instances.

Figure 3:
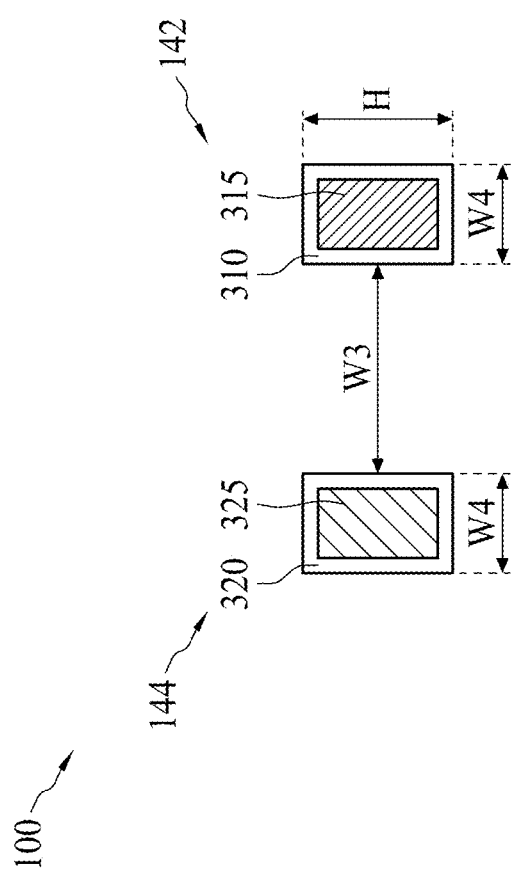
FIG. 3 is a cross-sectional view of a portion of a photonic system including an MRM, in accordance with some embodiments.

FIG. 3 is a cross-sectional view of the photonic system 100 including the MRM 120 in accordance with some embodiments. The cross-sectional view of FIG. 3 is taken along line B-B of FIG. 1. Similar elements in FIG. 3 have a same reference number as in FIG. 1. The photonic system 100 includes the first doped region 142 and the second doped region 144. The first doped region 142 is spaced from the second doped region 144 by a width W3. In some embodiments, the width W3 ranges from about 0.01 µm to about 10 µm. If the width W3 is too large, then cooling efficiency of the cooling element 140 is reduced, in some embodiments. If the width W3 is too small, then a risk of short circuiting between the first doped region 142 and the second doped region 144 increases, in some instances. In some embodiments, a space between adjacent first doped regions 142 and second doped regions 144 is uniform across the entire photonic system 100. In some embodiments, at least one space between a first doped region 142 and an adjacent second doped region 144 is different from a space between another first doped region 142 and another adjacent second doped region 144.

The first doped region 142 includes a semiconductor material 310. In some embodiments, the semiconductor material 310 includes silicon. In some embodiments, the semiconductor material 310 includes poly silicon, a compound semiconductor material, or another type of semiconductor material. Within the semiconductor material 310 is a doped area 315 including dopants of the first dopant type. In some embodiments, a dopant concentration of the doped area 315 ranges from about $1e^{17}$ dopants/cm$^3$ to about $1e^{19}$ dopants/cm$^3$. If the dopant concentration of the doped area 315 is too large, then the resistance in the first doped region 142 does not generate sufficient cooling for adjusting the temperature of the MRM 120, in some instances. If the dopant concentration of the doped area 315 is too small, then power consumption by the cooling element 140 increases, in some instances. In some embodiments, a width W4 of the first doped region 142 ranges from about 0.01 µm to about 10 µm. If the width W4 is too large, then a size of the photonic system 100 is increased without appreciable improvement in performance, in some instances. If the width W4 is too small, then a resistance within the first doped region 142 is increased and cooling efficiency is reduced, in some instances. In some embodiments, a height H of the first doped region 142 ranges from about 0.01 µm to about 10 µm. If the height H is too large, then a size of the photonic system 100 is increased without appreciable improvement in performance, in some instances. If the height H is too small, then a resistance within the first doped region 142 is increased and cooling efficiency is reduced, in some instances.

The second doped region 144 includes a semiconductor material 320. In some embodiments, the semiconductor material 320 includes silicon. In some embodiments, the semiconductor material 320 includes poly silicon, a compound semiconductor material, or another type of semiconductor material. In some embodiments, the semiconductor material 310 is a same material as the semiconductor material 320. In some embodiments, the semiconductor material 310 is different from the semiconductor material 320. Within the semiconductor material 320 is a doped area 325 including dopants of the second dopant type. In some embodiments, a dopant concentration of the doped area 325 ranges from about $1e^{17}$ dopants/cm$^3$ to about $1e^{19}$ dopants/cm$^3$. If the dopant concentration of the doped area 325 is too large, then the resistance in the second doped region 144 does not generate sufficient cooling for adjusting the temperature of the MRM 120, in some instances. If the dopant concentration of the doped area 325 is too small, then power consumption by the cooling element 140 increases, in some instances. In some embodiments, a width W4 of the second doped region 144 ranges from about 0.01 μm to about 10 μm. If the width W4 is too large, then a size of the photonic system 100 is increased without appreciable improvement in performance, in some instances. If the width W4 is too small, then a resistance within the second doped region 144 is increased and cooling efficiency is reduced, in some instances. In some embodiments, the width of the first doped region 142 is equal to the width of the second doped region 144. In some embodiments, the first doped region 142 has a different width from the second doped region 144. In some embodiments, a height H of the second doped region 144 ranges from about 0.01 μm to about 10 μm. If the height H is too large, then a size of the photonic system 100 is increased without appreciable improvement in performance, in some instances. If the height H is too small, then a resistance within the second doped region 144 is increased and cooling efficiency is reduced, in some instances. In some embodiments, the height of the first doped region 142 is equal to the height of the second doped region 144. In some embodiments, the first doped region 142 has a different height from the second doped region 144.

Figure 4:
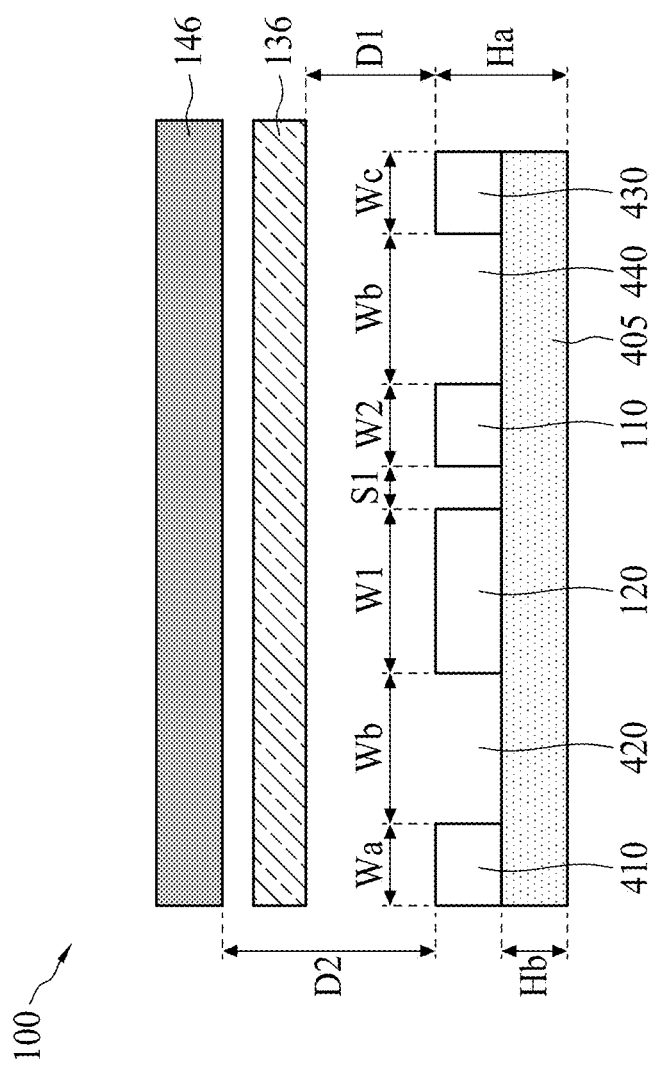
FIG. 4 is a cross-sectional view of a portion of a photonic system including an MRM, in accordance with some embodiments.

FIG. 4 is a cross-sectional view of the photonic system 100 including the MRM 120 in accordance with some embodiments. The cross-sectional view of FIG. 4 is taken along line C-C of FIG. 1. Similar elements in FIG. 4 have a same reference number as in FIG. 1 and FIG. 2. The photonic system 100 includes a substrate 405 supporting the MRM 120 and the waveguide 110. The photonic system 100 further includes a first slab protrusion 410 separated from the MRM 120 by a first gap 420. The photonic system 100 further includes a second slab protrusion 430 separated from the waveguide 110 by a second gap 440. The substrate 405 is integral with the MRM 120 and the waveguide 110. In some embodiments, the substrate 405 is separate from at least one of the waveguide 110 or the MRM 120. The first slab protrusion 410 and the second slab protrusion 430 are the result of the manufacturing process and are not intended to function as part of the photonic system 100. However, removal of the first slab protrusion 410 and the second slab protrusion 430 incurs additional processing time and cost. Additionally, the additional processing to remove the first slab protrusion 410 and the second slab protrusion 430 potentially impacts the performance of the MRM 120.

In some embodiments, a width Wa of the first slab protrusion 410 is less than about 10 μm. If the width Wa is too large, then a size of the photonic device 100 is increased without significant difference in device performance, in some instances. In some embodiments, the first slab protrusion 410 is eliminated entirely, so the width Wa is zero. In some embodiments, a width Wc of the second slab protrusion 430 is less than about 10 μm. If the width Wc is too large, then a size of the photonic device 100 is increased without significant difference in device performance, in some instances. In some embodiments, the second slab protrusion 430 is eliminated entirely, so the width Wc is zero. In some embodiments, the width Wa is equal to the width Wc. In some embodiments, the width Wa is different from the width Wc. In some embodiments, a width Wb of the first gap 420 ranges from about 0.1 μm to about 10 μm. If the width Wb is too small, a risk of the optical signal coupling from the MRM 120 into the first slab protrusion 410 increases, in some instances. If the width Wb is too large, the size of the photonic system 100 increase without appreciable improvement in performance, in some instances. In some embodiments, where the first slab protrusion 410 is removed, the first gap 420 is also eliminated. In some embodiments, a width Wd of the second gap 440 ranges from about 0.1 μm to about 10 μm. If the width Wd is too small, a risk of the optical signal coupling from the waveguide 110 into the second slab protrusion 430 increases, in some instances. If the width Wd is too large, the size of the photonic system 100 increase without appreciable improvement in performance, in some instances. In some embodiments, where the second slab protrusion 430 is removed, the second gap 440 is also eliminated. In some embodiments, the width Wb is equal to the width Wd. In some embodiments, the width Wb is different from the width Wd.

In some embodiments, a height Ha of the MRM 120 from a bottom of the substrate 405 ranges from about 0.01 μm to about 10 μm. If the height Ha is too small, degradation of the optical signal within the MRM 120 is increased due to a larger number of reflections, in some instances. If the height Ha is too large, a size of the photonic system 100 is increased without appreciable improvement in performance in some instances. In some embodiments, a height Hb of the substrate 405 is less than about 10 μm. If the height Hb is too large, then a size of the photonic system 100 is increased without appreciable improvement in performance, in some instances. In some embodiments, the substrate 405 is removed entirely, e.g., by grinding or etching, and the height Hb is zero.

Figure 5:
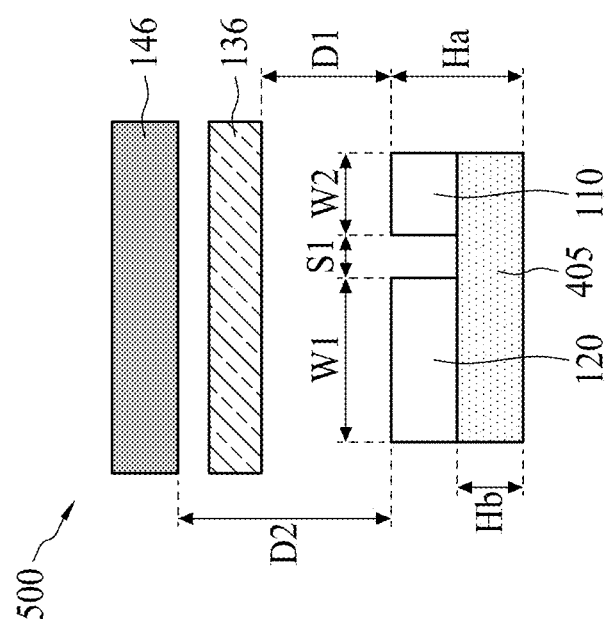
FIG. 5 is a cross-sectional view of a portion of a photonic system including an MRM, in accordance with some embodiments.

FIG. 5 is a cross-sectional view of the photonic system 500 including the MRM 120 in accordance with some embodiments. The cross-sectional view of FIG. 5 is taken along line C-C of FIG. 1. Similar elements in FIG. 5 have a same reference number as in FIG. 1 and FIG. 4. In comparison with the photonic system 100 in FIG. 4, the photonic system 500 excludes the first slab protrusion 410, the second slab protrusion 430 and the portions of the substrate 405 extending beyond the waveguide 110 and the MRM 120. In some embodiments, the arrangement of photonic system 500 is called a slab-free arrangement. One of ordinary skill in the art would recognize that the slab-free arrangement is usable with respect to the photonic system 100 in FIGS. 1-3.

In comparison with the photonic system 100 in FIG. 4, the photonic system 500 includes additional processing operations to remove the first slab protrusion 410, the second slab protrusion, and the portions of the substrate 405 beyond the waveguide 110 and the MRM 120. However, the slab-free arrangement has improved process variation in comparison with the photonic system 100 in FIG. 4. As a result, the MRM 120 is less likely to have a significantly different from the designed refractive index; and tuning of the MRM 120 would require less heating or cooling. The reduced heating or cooling helps to reduce power consumption for a device including the photonic system 500 in comparison with the photonic system 100 in FIG. 4.

Figure 6:
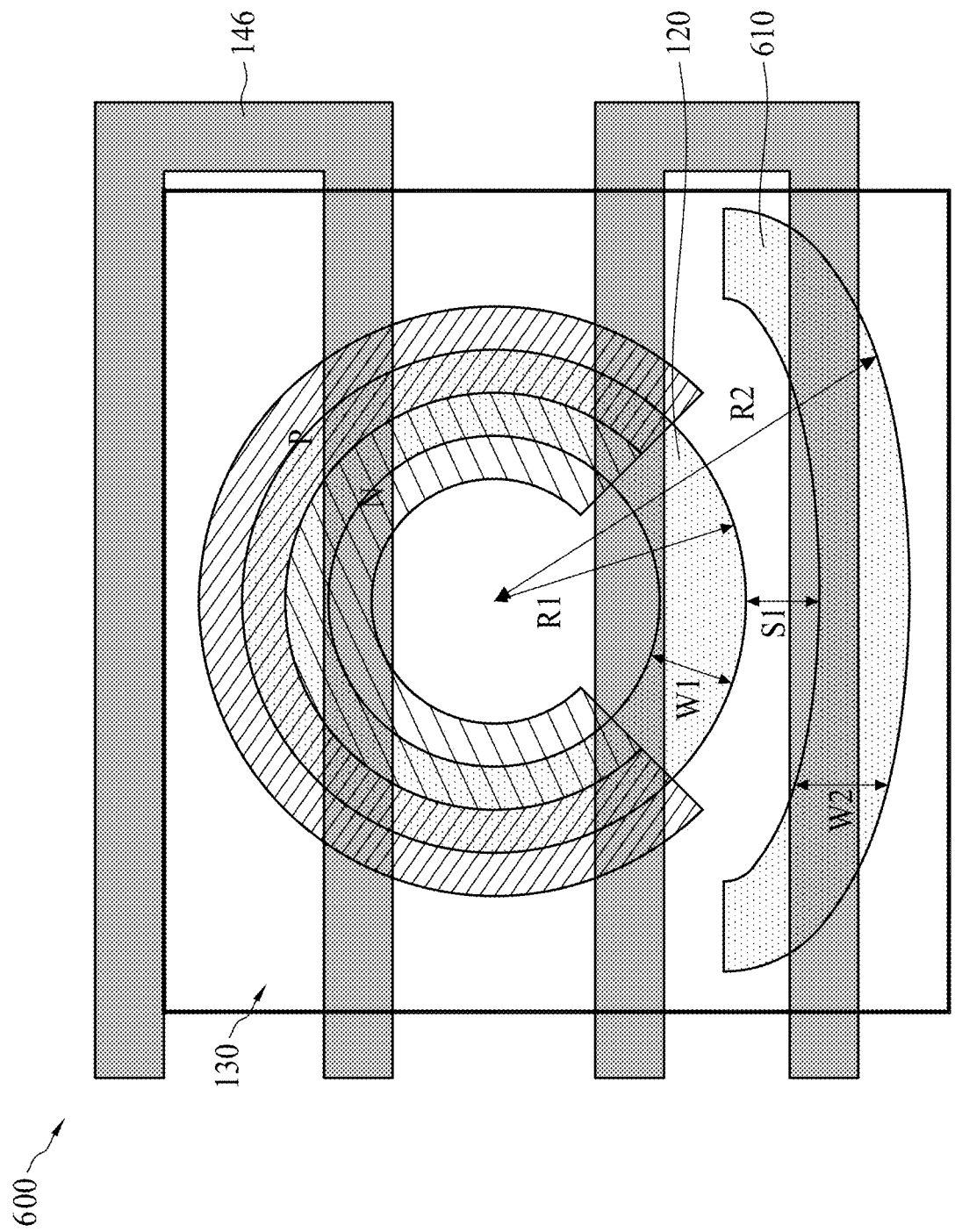
FIG. 6 is a top view of a portion of a photonic system including an MRM, in accordance with some embodiments.

FIG. 6 is a top view of a portion of a photonic system 600 including the MRM 120, in accordance with some embodiments. The photonic system 600 is similar to the photonic system 100 (FIG. 1); and similar elements having a same reference number. In comparison with the photonic system 100 (FIG. 1), the photonic system 600 includes a curved waveguide 610. Dimensions, material, and shape of the waveguide 610 are similar to the waveguide 110 (FIG. 1); however, the waveguide 610 is curved instead of straight. The waveguide 610 has a radius R2. The radius R2 is larger than the radius R1 of the MRM 120. In some embodiments, a radius R2 the waveguide 610 ranges from about 1 μm to about 30 μm. If the radius R2 of the waveguide 610 is too small, signal loss increases as a result of a number of reflections as the optical signal propagates through the curve of the waveguide 610, in some instances. If the radius R2 of the waveguide 610 is too large, an overall size of the photonic system 600 increases without an appreciable increase in performance, in some instances.

The photonic system 600 is useful for routing optical signals of a device between components that are not aligned. The use of the curved waveguide 610 permits the propagation between components which are offset in two dimensions instead of just one dimension, as in the photonic system 100 (FIG. 1). One of ordinary skill in the art would understand that the photonic system 600 is able to be implemented in both the slab-free arrangement and an arrangement including slab components; and that the description details in FIGS. 1-5 are applicable to the photonic system 600. One of ordinary skill in the art would recognize that while the photonic system 600 in FIG. 6 includes the waveguide 610 curving in a same direction as the MRM 120, a waveguide 610 that curves in an opposite direction from the MRM 120 is also within the scope of this description.

Figure 7:
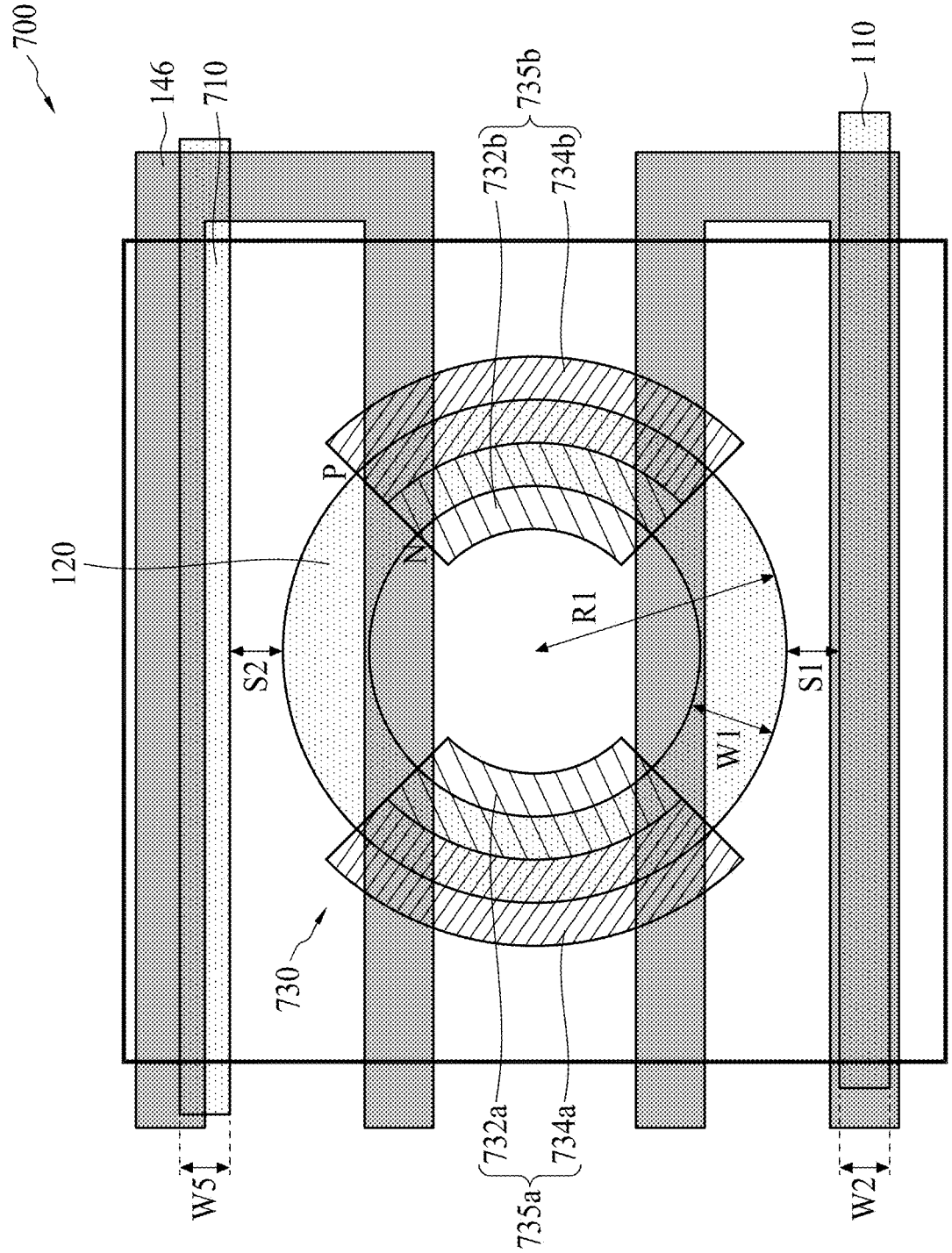
FIG. 7 is a top view of a portion of a photonic system including an MRM, in accordance with some embodiments.

FIG. 7 is a top view of a portion of a photonic system 700 including the MRM 120, in accordance with some embodiments. The photonic system 700 is similar to the photonic system 100 (FIG. 1); and similar elements having a same reference number. In comparison with the photonic system 100 (FIG. 1), the photonic system 700 includes a waveguide 710 on an opposite side of the MRM 120 from the waveguide 110. Further, in comparison with the photonic system 100 (FIG. 1), the photonic system 700 includes a heater 730 different from the heater 130 (FIG. 1). Dimensions, material, and shape of the waveguide 710 are similar to the waveguide 110 (FIG. 1).

The heater 730 includes a first doped region pair 735a discontinuous with a second doped region pair 735b, instead of the single continuous doped region pair of the photonic system 100 (FIG. 1). The first doped region pair 735a includes a first doped region 732a having the first dopant type; and a second doped region 734a having the second dopant type. The second doped region pair 735b includes a first doped region 732b having the first dopant type; and a second doped region 734b having the second dopant type. Each of the first doped regions 732a and 732b have a similar shape and doping concentration as the first doped region 132 (FIG. 1) except the first doped regions 732a and 732b extend over less of the MRM 120 than the first doped region 132 (FIG. 1). Similarly, each of the second doped regions 734a and 734b have a similar shape and doping concentration as the second doped region 134 (FIG. 1) except the second doped regions 734a and 734b extend over less of the MRM 120 than the second doped region 134 (FIG. 1). Due to the discontinuity between the first doped region pair 735a and the second doped region pair 735b, the MRM 120 is capable of coupling with both the waveguide 110 and the waveguide 710. This increased functionality permits the photonic system 700 to transfer optical signals between the waveguide 110 and the waveguide 710 using the MRM 120.

The waveguide 710 includes a core including an optically transparent material and is configured to permit propagation of an optical signal along the waveguide 710. In some embodiments, the core of the waveguide 710 includes silicon. In some embodiments, the core of the waveguide 710 includes polymer, glass, silicon nitride or another suitable material. In some embodiments, the core of waveguide 710 includes a same material as the core of the waveguide 110 and the MRM 120. In some embodiments, the core of the waveguide 710 includes a different material from at least one of the core of the waveguide 110 or the MRM 120. A cladding material surrounds the core. The cladding material has a different refractive index from the core in order to help reduce an amount of signal loss as the optical signal propagates along the waveguide 710. In some embodiments, the cladding has a lower refractive index than the core. In some embodiments, the cladding material is silicon oxide, polymer, or another suitable material. In some embodiments, the cladding of waveguide 710 includes a same material as the core of the waveguide 110 and the MRM 120. In some embodiments, the cladding of the waveguide 710 includes a different material from at least one of the core of the waveguide 110 or the MRM 120. In some embodiments, the waveguide 710 has a circular cross-section. In some embodiments, the waveguide 710 has a rectangular cross-section, a triangular cross-section, or another suitable cross-sectional shape. In some embodiments, a cross-sectional shape of waveguide 710 is a same shape as the waveguide 110 and the MRM 120. In some embodiments, the cross-sectional shape of the waveguide 710 is different from at least one of the waveguide 110 or the MRM 120. In some embodiments, a width W5 of the waveguide 710 ranges from about 0.01 μm to about 10 μm. If the width W5 of the waveguide 710 is too small, a risk of optical signal loss due to an increased number of reflections during propagation increases, in some instances. If the width W5 of the waveguide 750 is too large, an overall size of the photonic system 700 increases without an appreciable increase in performance, in some instances.

The MRM 120 is positioned close to, but not in contact with, the waveguide 710. A size of a spacing S2 between the MRM 120 and the waveguide 710 determines the coupling efficiency between the MRM 120 and the waveguide 710. In some embodiments, a spacing S2 between the MRM 120 and the waveguide 710 ranges from about 0.01 μm to about 10 μm. If the spacing S2 is too small a risk of unintentional leakage from the waveguide 710 into the MRM 120 increases, in some instances. If the spacing S2 is too large coupling of the optical signal between the waveguide 710 and the MRM 120 is inefficient and a high signal loss results, in some instances. In addition to the spacing S2, optical properties, such as refractive index, also impact coupling efficiency. Light coupled from the waveguide 710 into the MRM 120 travels in a direction counter to a propagation direction of the optical signal in the waveguide 710. The light intensifies due to constructive interference within the MRM 120, which helps to facilitate optical signal transfer between the waveguide 710 and the waveguide 110.

The photonic system 700 is useful for routing optical signals of a device between components that are not aligned. The ability to couple optical signals between the waveguide 110 and the waveguide 710 allows communication between components which are offset in two dimensions instead of just one dimension, as in the photonic system 100 (FIG. 1). One of ordinary skill in the art would understand that the photonic system 700 is able to be implemented in both the slab-free arrangement and an arrangement including slab components; and that the description details in FIGS. 1-5 are applicable to the photonic system 700. One of ordinary skill in the art would also understand that while the photonic system 700 includes straight waveguides 110 and 710, in some embodiments, at least one of the waveguides in the photonic system 700 is curved, such as curved waveguide 610 (FIG. 6).

Figure 8:
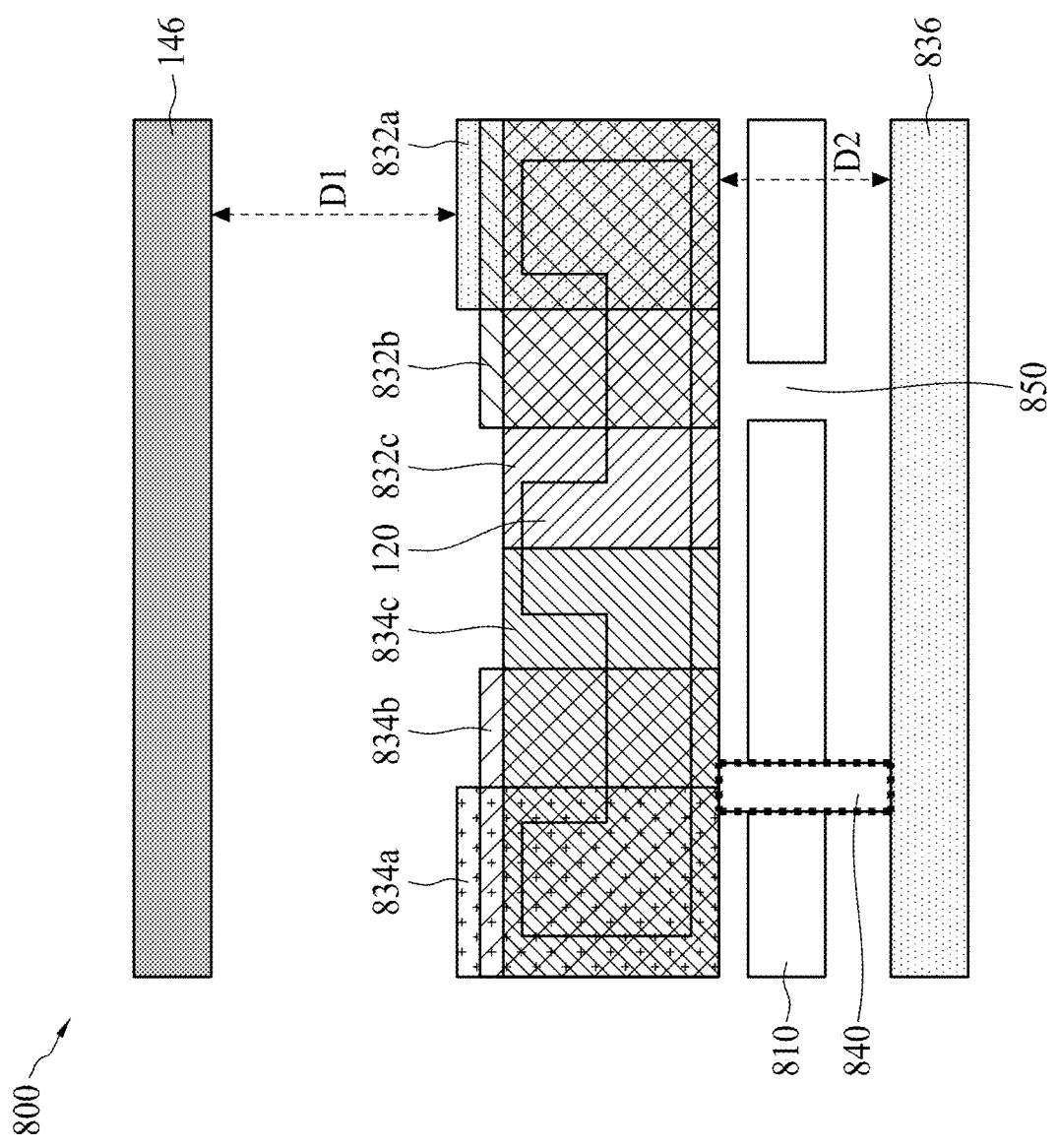
FIG. 8 is a cross-sectional view of a portion of a photonic system including an MRM, in accordance with some embodiments.

FIG. 8 is a top view of a portion of a photonic system 800 including the MRM 120, in accordance with some embodiments. The photonic system 800 is similar to the photonic system 100 (FIG. 2), i.e., the cross-sectional view is taken along the line A-A in a photonic system similar to the photonic system 100 (FIG. 1); and similar elements having a same reference number. In comparison with the photonic system 100 (FIG. 2), the photonic system 800 includes a substrate 810 and a heater conductive element 836 on an opposite side of the substrate 810 from the MRM 120. Further, in comparison with the photonic system 100 (FIG. 2), the photonic system 800 includes different doping regions, as described below. In some embodiments, the photonic system 800 includes a thermal via 840 extending through the substrate to provide conductive heat transfer between the heater conductive element 836 and the MRM 120.

In some embodiments, the substrate 810 between the heater conductive element 836 and the MRM 120 is continuous with no openings or gaps. In some embodiments, the thermal via 840 is also electrically conductive and provides an electrical signal between the heater conductive element 836 and the doped region 834*b*. While a single thermal via 840 is included in FIG. 8, one of ordinary skill in the art would understand that multiple thermal vias 840 are within the scope of this description. In some embodiments, the photonic system 800 further includes an opening 850 in the substrate 810 to facilitate heat transfer between the heater conductive element 836 and the MRM 120. While a single opening 850 is included in FIG. 8, one of ordinary skill in the art would understand that multiple openings 850 are within the scope of this description. While the photonic system 800 in FIG. 8 includes both a thermal via 840 and an opening 850, one of ordinary skill in the art would understand that a photonic system including only one or more thermal vias 840 without any openings 850; and a photonic system including only one or more openings 850 without any thermal vias 840 are also within the scope of this description.

In some embodiments, the heater conductive element 836 is in direct contact with the substrate 810 on the opposite side from the MRM 120. In some embodiments, the heater conductive element 836 is spaced from the substrate 810 on the opposite side from the MRM 120.

In order to help facilitate the change in location of heater conductive element 836 on the opposite side of the substrate 810 from the MRM 120, positions of doped regions 832*a-c* and 834*a-c* are adjusted in comparison with the photonic device 100 (FIG. 2). Each of the doped regions 832*a-c* have the first dopant type and have dopant concentrations similar to those described above with respect to the first doped region 132. In some embodiments, each of the doped regions 832*a-c* have a same dopant concentration. In some embodiments, at least one of the doped regions 832*a-c* has a different dopant concentration from at least one other of the doped regions 832*a-c*. Each of the doped regions 834*a-c* have the second dopant type and have dopant concentrations similar to those described above with respect to the second doped region 134. In some embodiments, each of the doped regions 834*a-c* have a same dopant concentration. In some embodiments, at least one of the doped regions 834*a-c* has a different dopant concentration from at least one other of the doped regions 834*a-c*. The doped region 832*a* and the doped region 834*a* are usable to provide electrical connection to the conductive element 146. The doped region 832*c* and the doped region 834*c* are usable as doped regions within the MRM 120. The doped region 832*b* and the doped region 834*b* are usable as doped regions for heating the MRM 120, similar to the first doped region 132 and the second doped region 134 (FIG. 2).

The thermal via 840 is configured to provide a path for heat generated by the heater conductive element 836 to increase a temperature of the MRM 120. In some embodiments, the thermal via 840 includes copper, tungsten, polymer, or another suitable thermally conductive material. In some embodiments, the thermal via 840 further includes a liner between the substrate 810 and the thermally conductive material to help minimize diffusion of the thermally conductive material into the substrate 810. In some embodiments, the liner includes silicon oxide, silicon nitride, or another suitable liner material. In some embodiments, the thermal via 840 is also electrically conductive and is usable to provide a voltage to the doped region 834*b* for heating the MRM 120. In some embodiments, the thermal via 840 is formed by forming the MRM 120 on a first side of the substrate 810; etching the substrate 810 to define a thermal via opening; depositing a thermally conductive material in the thermal via opening; and forming the heater conductive element 836 in contact with the thermally conductive material.

The opening 850 is configured to provide a path for heat generated by the heater conductive element 836 to increase the temperature of the MRM 120. In some embodiments, the opening 850 is formed by forming the MRM 120 on a first side of the substrate 810; etching the substrate 810 to define the opening 850; and forming the heater conductive element 836 proximate the opening 850. Heat transfer between the heater conductive element 836 and the MRM 120 is less efficient through the opening 850 than heat transfer using the thermal via 840. However, the use of the opening 850 utilizes less processing operations and therefore reduces a risk of additional impact on the MRM 120 performance.

The photonic system 800 is useful for reducing a size of the photonic system in comparison with the photonic system 100 (FIG. 1) by placing some components of the photonic system 800 on an opposite side of the substrate 810. One of ordinary skill in the art would understand that the photonic system 800 is able to be implemented in both the slab-free arrangement and an arrangement including slab components; and that the description details in FIGS. 1-5 are applicable to the photonic system 800. One of ordinary skill in the art would also understand that while the photonic system 800 includes the conductive element 146 on a same side of the substrate 810 as the MRM 120, a photonic system which includes the heater conductive element 836 on a same side of the substrate 810 as the MRM 120; and the conductive element 146 on an opposite side of the substrate 810 from the MRM 120 is within the scope of this description.

Figure 9:
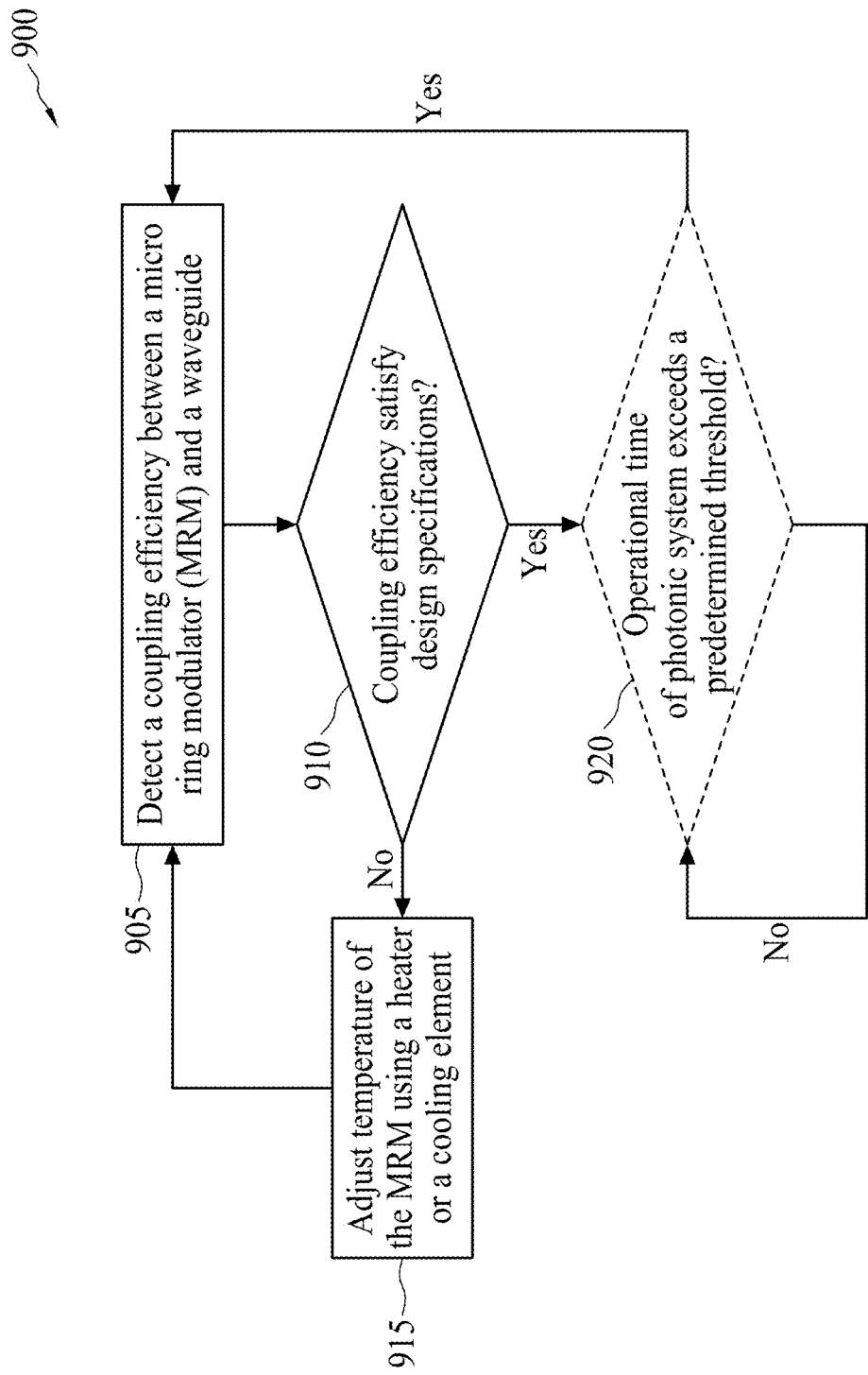
FIG. 9 is a flowchart of a method of using a photonic system including an MRM, in accordance with some embodiments.

FIG. 9 is a flowchart of a method 900 of using a photonic system in accordance with some embodiments. The method 900 is capable of being implemented using any of the photonic system 100 (FIGS. 1-4); the photonic system 500 (FIG. 5); the photonic system 600 (FIG. 6); the photonic system 700 (FIG. 7); the photonic system 800 (FIG. 8); or another suitable photonic system. The method 900 is usable for tuning of an MRM to couple with a waveguide.

In operation 905, a coupling efficiency between an MRM and a waveguide is detected. In some embodiments, the coupling efficiency is determined based on analysis of an optical signal received by a photodetector (PD). The PD detects one or more wavelengths and an intensity of each wavelength of the optical signal. The detected wavelengths and intensity are compared with design targets to determine how efficiently the optical signal propagated through the photonic system including the MRM. For example, in some embodiments where the MRM is configured to remove a specific wavelength from the optical signal, if the PD receives a high intensity of light of that wavelength from the waveguide, the coupling efficiency is determined to be low. In contrast, in some embodiments where the MRM is configured to insert a specific wavelength into the waveguide and the PD receives a high intensity of that waveguide from the waveguide, the coupling efficiency is determined to be high.

In operation 910, the detected coupling efficiency is compared with design specification to determine whether the detected coupling efficiency meets the design specifications. In some embodiments, the comparison is performed using a processor connected to a non-transitory computer readable medium configured to store the design specifications as well as the information used to determine coupling efficiency. In some embodiments, a threshold buffer with respect to the design specifications is used to determine whether the detected coupling efficiency satisfies the design specification. In some embodiments, the threshold buffer is predetermined by a photonic system designer. In response to a determination that the coupling efficiency meets the design specifications, the method 900 proceeds to optional operation 920, i.e., Yes in FIG. 9. In response to a determination that the coupling efficiency fails to meet the design specifications, the method 900 proceeds to operation 915, i.e., No in FIG. 9.

In operation 915, the temperature of the MRM is adjusted using a heater or a cooling element. In some embodiments, the heater corresponds to the heater 130 (FIG. 1), the heater 730 (FIG. 7), or another suitable heater. In some embodiments, the cooling element corresponds to the cooling element 140 (FIG. 1), or another suitable cooling element. In some embodiments, a processor, such as the processor used to determine the coupling efficiency, is usable to determine whether to use the heater or the cooling element. In some embodiments, the processor is part of the controller 150 (FIG. 1). In some embodiments, the processor relies on empirical data, e.g., stored in the non-transitory computer readable medium, from previously manufacturing photonic systems to determine whether the temperature of the MRM should be increased or decreased. In some embodiments, the processor is configured to activate one of the heater or the cooling element up to a predetermined temperature adjustment threshold to determine whether the coupling efficiency is able to be adjusted to satisfy the design specifications. Once the predetermined temperature adjustment threshold is reached, the process stops activating the previous one of the heater or the cooling element and begins activating the other of the heater or cooling element to attempt to adjust the coupling efficiency to meet the design specifications. In some embodiments, the predetermined temperature adjustment threshold is set based on the FSR of the target wavelength. In some embodiments, the temperature adjustment threshold is set to a temperature adjustment corresponding to approximately half of the FSR. For example, in some embodiments, the FSR is 7 nm, so the temperature adjustment threshold would be set to the temperature adjustment to change the resonance of the MRM by 3.5 nm. Using an example temperature change relationship of 0.07 nm/° C., the temperature adjustment threshold would be 50° C., in some embodiments. One of ordinary skill in the art would recognize that this is merely an example calculation and that other values and criteria for the predetermined temperature adjustment threshold are within the scope of this description. Following operation 915, the method 900 returns to operation 905 to determine a coupling efficiency with the MRM at the adjusted temperature.

In optional operation 920, an operational time of the photonic system is monitored to determine whether a threshold operation time is reached. In response to a determination that the threshold operation time is reached, the method 900 returns to operation 905, i.e., Yes in FIG. 9. In response to a determination that the threshold operational time is not reached, the method 900 repeats optional operation 920, i.e., No in FIG. 9. In some embodiments, the threshold operation time is set based on empirical data for operation of other photonic systems. In some embodiments, the threshold operation time is set by a designer of the photonic system. In some embodiments, the operation 920 is omitted and the photonic system operates utilizing a same temperature for the MRM first determined to satisfy the design specifications. Omitting the operation 920 potentially reduces a useful life of the photonic system, but reduces processing load for a processor or controller, e.g., the controller 150 (FIG. 1), of the photonic system.

In some embodiments, the method 900 includes additional operations. For example, in some embodiments, the method 900 includes detecting coupling efficiency between the MRM and another waveguide within the photonic system. In some embodiments, at least one operation of the method 900 is omitted. For example, in some embodiments, the optional operation 920 is omitted. In some embodiments, an order of operations of the method 900 is adjusted. For example, in some embodiments, an initial temperature of the MRM is set, based on empirical evidence from previously manufacturing photonic systems, using operation 915 prior to operation 905 in an attempt to minimize a number of iterations of the operations 905-915. One of ordinary skill in the art would recognize that additional modifications to the method 900 are within the scope of this description.

Figure 10D:
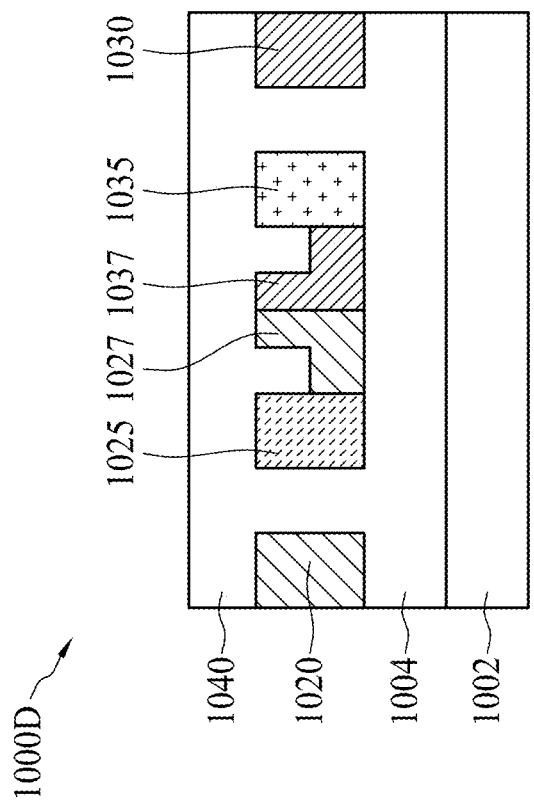

FIGS. 10A-10H are cross-sectional views of a portion of a photonic system having an MRM at various stages of manufacture, in accordance with some embodiments. FIG. 11 is a flowchart of a method 1100 of making a photonic system having an MRM, in accordance with some embodiments. For the sake of clarity description of the FIGS. 10A-10H and FIG. 11 are combined. However, one of ordinary skill in the art would understand that the structures in FIGS. 10A-10H are capable of being formed using methods other than method 1100 (FIG. 11). Further, one of ordinary skill in the art would understand that the method 1100 is capable of forming structures other than those in FIGS. 10A-10H.

FIG. 10A is a cross-sectional view of a portion of a photonic system 1000A having an MRM following formation of a wafer, in accordance with some embodiments. The photonic system 1000A includes a semiconductor layer 1002, an insulating layer 1004 over the semiconductor layer 1002, and a semiconductor layer 1006 over the insulating layer 1004.

In some embodiments, the semiconductor layer 1002 includes silicon, silicon germanium, or another suitable semiconductor material. In some embodiments, the insulating layer 1004 includes silicon oxide, silicon nitride, silicon oxynitride, or another suitable insulating material. In some embodiments, the semiconductor layer 1006 includes silicon, silicon germanium, or another suitable semiconductor material. In some embodiments, the semiconductor layer 1002 includes a same material as the semiconductor layer 1006. In some embodiments, the semiconductor layer 1002 include a different material from the semiconductor layer 1006.

Turning to FIG. 11, the method 1100 includes operation 1105 in which a wafer is etched to define ring structure and cooling structures. In some embodiments, the operation 1105 includes a single etching process. In some embodiments, the operation 1105 includes multiple etching processes. In some embodiments, the operation 1105 includes a wet etching process or a dry etching process. In some embodiments, the etching process further includes a photolithography process to define the locations where material is removed by the etching process.

FIG. 10B is a cross-sectional view of a portion of a photonic system 1000B having an MRM following etching of the wafer, in accordance with some embodiments. The photonic system 1000B is similar to the photonic system 1000A (FIG. 10A), and similar elements have a same reference number. In comparison with the photonic system 1000A (FIG. 10A), the photonic system 1000B includes a plurality of first recesses 1010 and a plurality of second recesses 1015.

The plurality of first recesses 1010 separate cooling structures from the ring structure. Each of the plurality of first recesses 1010 are deeper than each of the plurality of second recesses 1015. Each of the plurality of first recesses 1010 extend through an entirety of the semiconductor layer 1006. In some embodiments, at least one of the plurality of first recesses 1010 does not extend through an entirety of the semiconductor layer 1006. In some embodiments, at least one of the plurality of first recesses 1010 extends partially into the insulating layer 1004.

The plurality of second recesses 1015 define contours of the ring structure. Each of the plurality of second recesses 1015 extends through less than an entirety of the semiconductor layer 1006. In some embodiments, at least one of the plurality of second recesses 1015 has a different depth than another of the plurality of second recesses 1015. In some embodiments, the plurality of first recesses 1010 is formed simultaneously with the plurality of second recesses 1015. In some embodiments, the plurality of first recesses 1010 are formed before or after the plurality of second recesses 1015.

Returning to FIG. 11, in operation 1110 the ring structure and the cooling structures are doped. The doping includes doping a first portion of the ring structure and a first portion of the cooling structures using a first dopant having a first dopant type; and doping a second portion of the ring structure and a second portion of the cooling structures using a second dopant having a second dopant type. The first dopant type is opposite to the second dopant type. In some embodiments, the doping includes ion implantation. In some embodiments, the doping includes deposition of a layer including dopants followed by a thermal process to drive the dopants into the ring structure and the cooling structures.

In some embodiments, the doping of the first portion of the ring structure and the first portion of the cooling structures includes a single doping step. In some embodiments, the doping of the first portion of the ring structure and the first portion of the cooling structures includes multiple doping steps. In some embodiments, all doping steps use a same species of dopant having the first dopant type. In some embodiments, at least one doping step uses a different species of dopant from another doping step. In some embodiments, each of the first portion of the ring structure and the first portion of the cooling structures have a same dopant concentration. In some embodiments, at least one of the first portion of the ring structure or the first portion of the cooling structure has a different dopant concentration from another of the first portion of the ring structure or the first portion of the cooling structure.

In some embodiments, the doping of the second portion of the ring structure and the second portion of the cooling structures includes a single doping step. In some embodiments, the doping of the second portion of the ring structure and the second portion of the cooling structures includes multiple doping steps. In some embodiments, all doping steps use a same species of dopant having the second dopant type. In some embodiments, at least one doping step uses a different species of dopant from another doping step. In some embodiments, each of the second portion of the ring structure and the second portion of the cooling structures have a same dopant concentration. In some embodiments, at least one of the second portion of the ring structure or the second portion of the cooling structure has a different dopant concentration from another of the second portion of the ring structure or the second portion of the cooling structure.

Figure 10C:
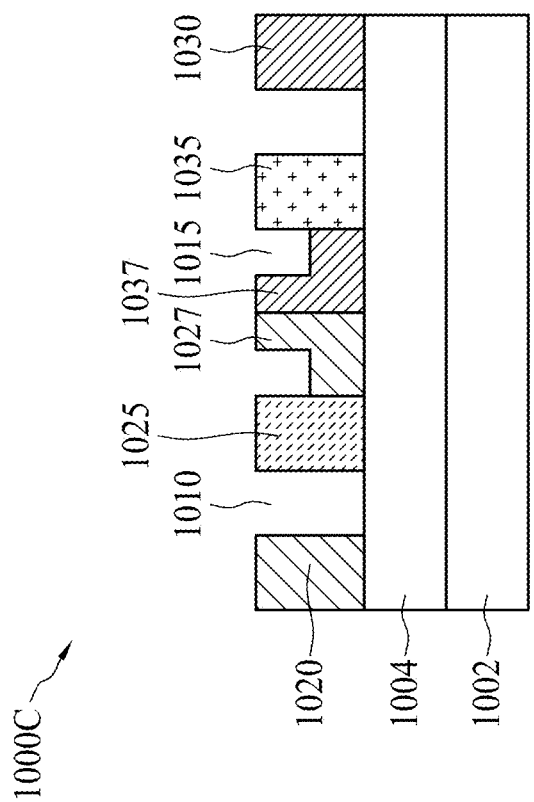
Figure 11:
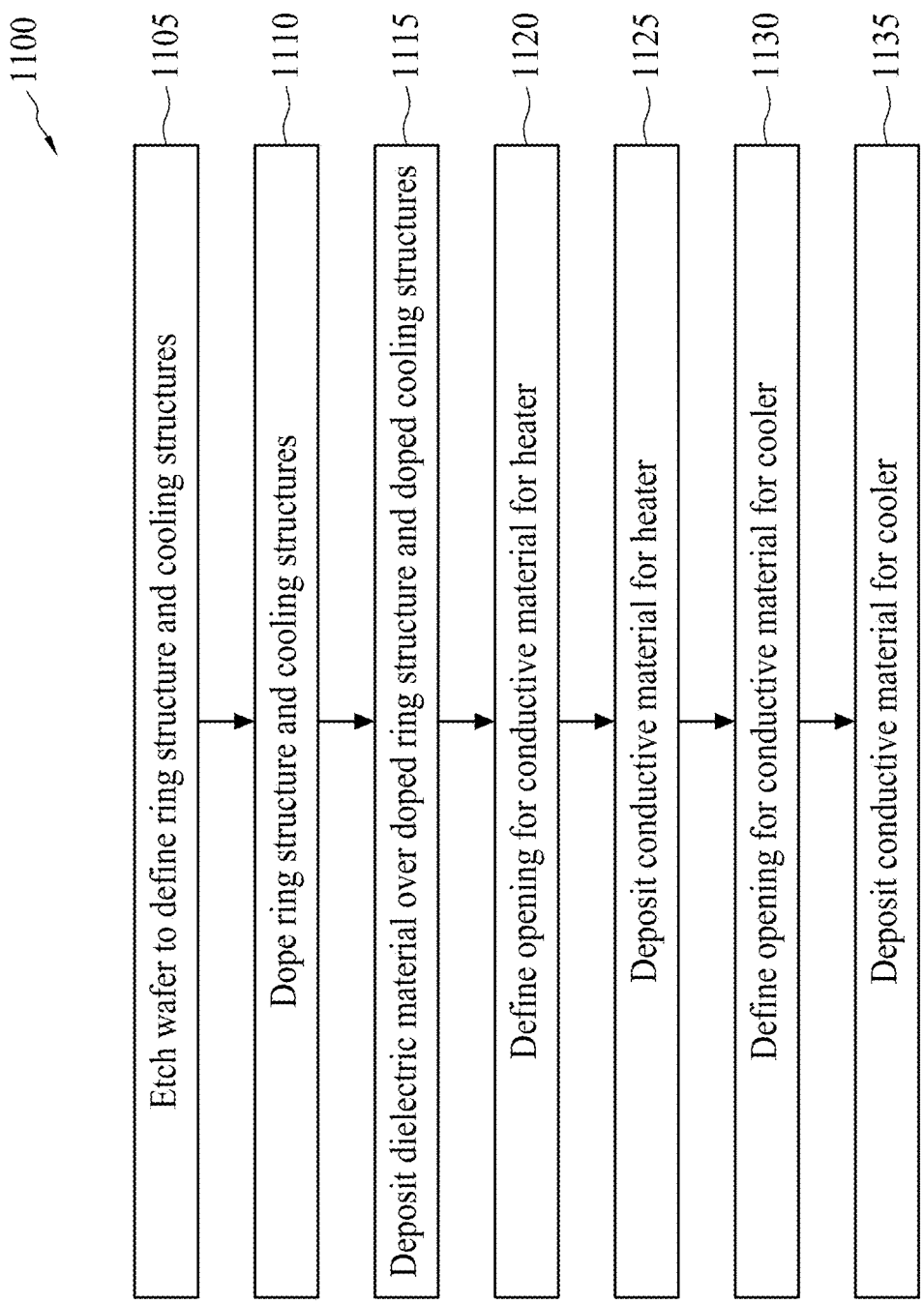
FIG. 11 is a flowchart of a method of making a photonic system including an MRM, in accordance with some embodiments.

FIG. 10C is a cross-sectional view of a portion of a photonic system 1000C having a MRM following one or more doping processes, in accordance with some embodiments. The photonic system 1000C is similar to the photonic system 1000B (FIG. 10B), and similar elements have a same reference number. In comparison with the photonic system 1000B (FIG. 10B), the photonic system 1000C includes a doped first portion 1020 of the cooling structures; and a doped second portion 1030 of the cooling structures. The photonic system 1000C further includes doped portions 1025 and 1027 of the ring structure having dopants of a first type; and doped portions 1035 and 1037 of the ring structure having dopants of a second type, opposite the first type.

In some embodiments, the doped portion 1025 is similar to the doped region 834a (FIG. 8). In some embodiments, the doped portion 1027 is similar to the doped regions 834b and 834c (FIG. 8). The doped first portion 1020 provides electrical connection to a conductive material of a cooling element. In some embodiments, a dopant concentration of the doped regions 1025 and 1027 is similar to a dopant concentration of the doped first portion 1020. In some embodiments, the dopant concentration of the doped regions 1025 or 1027 is different from the dopant concentration of the doped first portion 1020. In some embodiments, a dopant species of the doped regions 1025 and 1027 is the same as a dopant species of the doped first portion 1020. In some embodiments, the dopant species of the doped regions 1025 or 1027 is different from the dopant species of the doped first portion 1020.

In some embodiments, the doped portion 1035 is similar to the doped region 832a (FIG. 8). In some embodiments, the doped portion 1037 is similar to the doped regions 832b and 832c (FIG. 8). The doped second portion 1030 provides electrical connection to a conductive material of the cooling element. In some embodiments, a dopant concentration of the doped regions 1035 and 1037 is similar to a dopant concentration of the doped second portion 1030. In some embodiments, the dopant concentration of the doped regions 1035 or 1037 is different from the dopant concentration of the doped second portion 1030. In some embodiments, a dopant species of the doped regions 1035 and 1037 is the same as a dopant species of the doped second portion 1030. In some embodiments, the dopant species of the doped regions 1035 or 1037 is different from the dopant species of the doped second portion 1030.

Returning to FIG. 11, the method 1100 further includes operation 1115 in which a dielectric material is deposited over the doped ring structure and the doped cooling structures. The dielectric material fills a space between the ring structure and the cooling structures. The dielectric material extends above the ring structure and the cooling structures. In some embodiments, the dielectric material includes silicon oxide, silicon nitride, silicon oxynitride, or another suitable dielectric material. In some embodiments, the dielectric material is deposited using CVD, PVD, ALD, or another suitable deposition process. In some embodiments, a planarization process, such as a chemical mechanical polishing (CMP) process, follows the deposition process in order to form a flat top surface for subsequent processing.

FIG. 10D is a cross-sectional view of a portion of a photonic system 1000D having a MRM following deposition of a dielectric material, in accordance with some embodiments. The photonic system 1000D is similar to the photonic system 1000C (FIG. 10C), and similar elements have a same reference number. In comparison with the photonic system 1000C (FIG. 10C), the photonic system 1000D includes a dielectric material 1040 over the ring structure and the cooling structures.

The dielectric material 1040 fills spaces between the ring structure and the cooling structures. The dielectric material 1040 extends over a top of the ring structure and the cooling structures. In some embodiments, a material of the dielectric material 1040 includes a same material as the insulating layer 1004. In some embodiments, the material of the dielectric material 1040 is different from the material of the insulating layer 1004.

Returning to FIG. 11, the method 1100 includes operation 1120 in which the dielectric material is etched to define an opening for a conductive material for a heater. In some embodiments, the operation 1120 includes a single etching process. In some embodiments, the operation 1120 includes multiple etching processes. In some embodiments, the operation 1120 includes a wet etching process or a dry etching process. In some embodiments, the etching process further includes a photolithography process to define the locations where material is removed by the etching process.

Figure 10F:
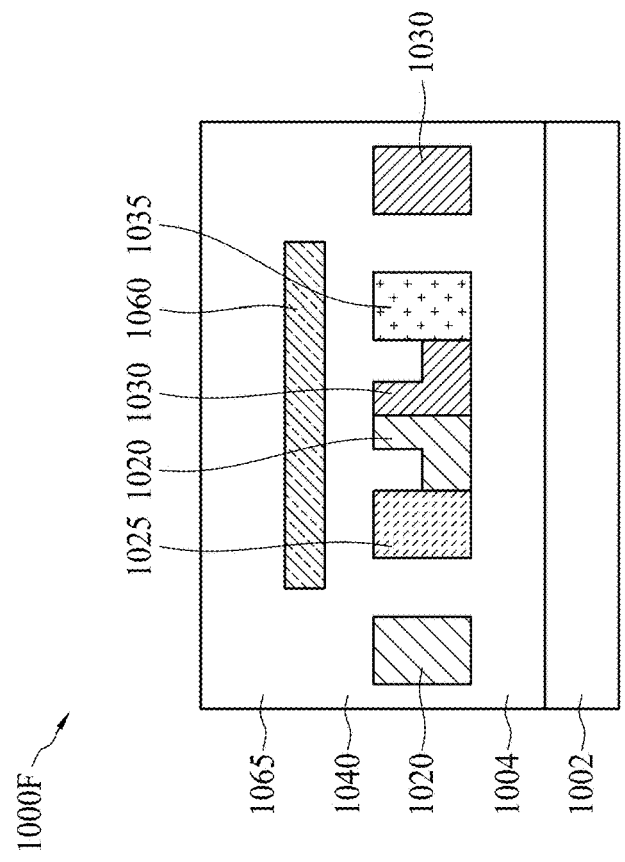
Figure 10E:
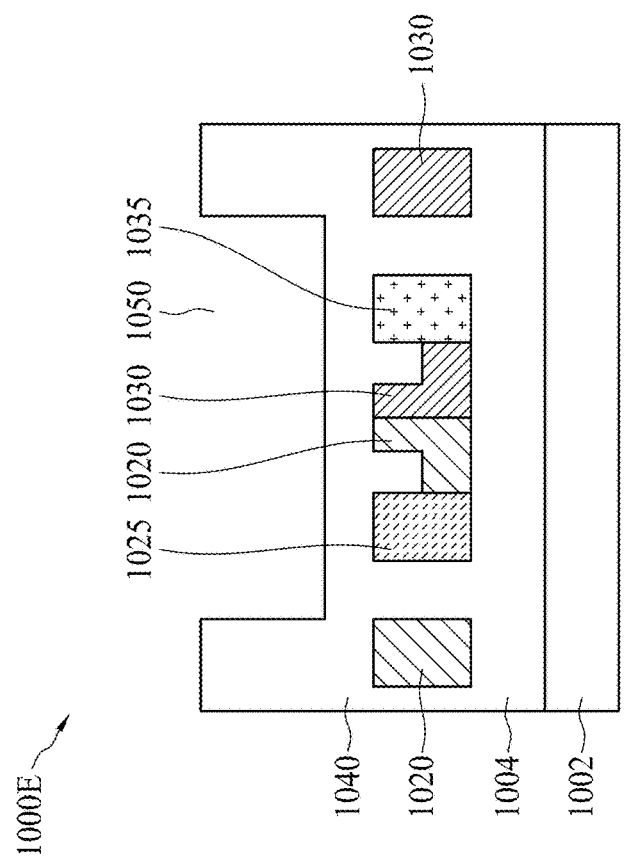

FIG. 10E is a cross-sectional view of a portion of a photonic system 1000E having an MRM following etching of the dielectric material, in accordance with some embodiments. The photonic system 1000E is similar to the photonic system 1000D (FIG. 10D), and similar elements have a same reference number. In comparison with the photonic system 1000D (FIG. 10D), the photonic system 1000E includes an opening 1050. The opening 1050 is positioned to receive a conductive layer of the heater. The opening 1050 is proximate the ring structure. In some embodiments, the opening 1050 is aligned with edges of the ring structure. In some embodiments, the opening 1050 is narrower than the ring structure. In some embodiments, the opening 1050 is wider than the ring structure. The opening 1050 is offset from sidewalls of the cooling structures 1020 and 1030.

Returning to FIG. 11, the method 1100 further includes operation 1125 in which a conductive material is deposited in the opening. The conductive material at least partially fills the opening. In some embodiments, the conductive material includes copper, aluminum, tungsten, cobalt, alloys therefor, or another suitable conductive material. In some embodiments, the conductive material is deposited using CVD, PVD, ALD, sputtering, plating or another suitable deposition process. In some embodiments, a planarization process, such as a CMP process, follows the deposition process in order to form a flat top surface for subsequent processing. In some embodiments, an additional layer of dielectric material is deposited over the conductive material.

FIG. 10F is a cross-sectional view of a portion of a photonic system 1000F having a MRM following deposition of a conductive material, in accordance with some embodiments. The photonic system 1000F is similar to the photonic system 1000E (FIG. 10E), and similar elements have a same reference number. In comparison with the photonic system 1000E (FIG. 10E), the photonic system 1000F includes a conductive material 1060 over the ring structure and a dielectric material 1065 over the conductive material 1060.

The conductive material 1060 is proximate the ring structure to permit heating of the ring structure. In some embodiments, the conductive material 1060 includes copper, aluminum, tungsten, cobalt, alloys therefor, or another suitable conductive material. In some embodiments, the conductive material 1060 is aligned with edges of the ring structure. In some embodiments, the conductive material 1060 is narrower than the ring structure. In some embodiments, the conductive material 1060 is wider than the ring structure. The conductive material 1060 is offset from sidewalls of the cooling structures 1020 and 1030, such that the conductive material 1060 does not overlap the cooling structures 1020 and 1030 in a plan view.

The dielectric material 1065 is over the conductive material 1060. The dielectric material 1065 over the ring structure and the cooling structures. In some embodiments, a material of the dielectric material 1065 includes a same material as the insulating layer 1004 and the dielectric material 1040. In some embodiments, the material of the dielectric material 1065 is different from the material of at least one of the insulating layer 1004 or the dielectric material 1040. In some embodiments, an interface exists between the dielectric material 1065 and the dielectric material 1040. In some embodiments, no interface exists between the dielectric material 1065 and the dielectric material 1040.

Returning to FIG. 11, the method 1100 includes operation 1130 in which the dielectric material is etched to define an opening for a conductive material for a cooling element. In some embodiments, the operation 1130 includes a single etching process. In some embodiments, the operation 1130 includes multiple etching processes. In some embodiments, the operation 1130 includes a wet etching process or a dry etching process. In some embodiments, the etching process further includes a photolithography process to define the locations where material is removed by the etching process.

FIG. 10G is a cross-sectional view of a portion of a photonic system 1000G having an MRM following etching of the dielectric material, in accordance with some embodiments. The photonic system 1000G is similar to the photonic system 1000F (FIG. 10F), and similar elements have a same reference number. In comparison with the photonic system 1000F (FIG. 10F), the photonic system 1000G includes an opening 1070. The opening 1070 is positioned to expose the doped portions of the cooling structure. In some embodiments, the opening 1070 exposes an entirety of each of the portions 1020 and 1030 of the cooling structure. In some embodiments, the opening 1070 exposes less than an entirety of at least one of the portion 1020 or the portion 1030.

Returning to FIG. 11, the method 1100 further includes operation 1135 in which a conductive material is deposited in the opening. The conductive material at least partially fills the opening. In some embodiments, the conductive material includes copper, aluminum, tungsten, cobalt, alloys therefor, or another suitable conductive material. In some embodiments, the conductive material is deposited using CVD, PVD, ALD, sputtering, plating or another suitable deposition process. In some embodiments, a planarization process, such as a CMP process, follows the deposition process in order to form a flat top surface for subsequent processing. In some embodiments, an additional layer of dielectric material is deposited over the conductive material.

FIG. 10H is a cross-sectional view of a portion of a photonic system 1000H having a MRM following deposition of a conductive material, in accordance with some embodiments. The photonic system 1000H is similar to the photonic system 1000G (FIG. 10G), and similar elements have a same reference number. In comparison with the photonic system 1000G (FIG. 10G), the photonic system 1000H includes a conductive material 1080 over electrically connected to the portions 1020 and 1030 of the cooling element and a dielectric material 1085 over the conductive material 1080.

The conductive material 1080 is electrically connected to the portions 1020 and 1030 of the cooling structures in order to cause cooling of the ring structure as current flows through the cooling structures. In some embodiments, the conductive material 1080 includes copper, aluminum, tungsten, cobalt, alloys therefor, or another suitable conductive material. In some embodiments, a material of the conductive material 1080 is a same material as the conductive material 1060. In some embodiments, a material of the conductive material 1080 is different from the conductive material 1060.

The dielectric material 1085 is over the conductive material 1080. The dielectric material 1085 over the ring structure and the cooling structures. In some embodiments, a material of the dielectric material 1085 includes a same material as the insulating layer 1004, the dielectric material 1040 and the dielectric material 1065. In some embodiments, the material of the dielectric material 1085 is different from the material of at least one of the insulating layer 1004, the dielectric material 1040, or the dielectric material 1065. In some embodiments, an interface exists between the dielectric material 1065 and the dielectric material 1085. In some embodiments, no interface exists between the dielectric material 1065 and the dielectric material 1085.

One of ordinary skill in the art would recognize that the method 1100 and the structures of FIGS. 10A-10H are merely exemplary. One of ordinary skill in the art would understand that the method 1100 and the structures of FIGS. 10A-10H are adjustable to accommodate different designs for the photonic system, such as locating a conductive element for a heater or cooling element on a backside of the substrate, e.g., semiconductor layer 1002.

One of ordinary skill in the art would understand that additional operations are able to be included in the method 1100. For example, in some embodiments, a waveguide is formed from the semiconductor layer 1006. One of ordinary skill in the art would understand that at least one operation of the method 1100 is omitted. For example, in some embodiments, the operation 1105 is omitted and a growth process, such as an epitaxial process, is used to define the ring structure and the cooling structures. One of ordinary skill in the art would understand that an order of operations of the method 1100 are adjusted. For example, in some embodiments, the operations 1130 and 1135 are performed prior to the operations 1120 and 1125 in order to form a structure where the conductive element of a cooling element is closer to the ring structure than the conductive element of a heater.

An aspect of this description relates to a photonic system. The photonic system includes a waveguide. The photonic system further includes a micro ring modulator (MRM) spaced from the waveguide. The photonic system further includes a heater configured to increase a temperature of the MRM in response to the heater receiving a first voltage. The photonic system further includes a cooling element configured to decrease a temperature of the MRM in response to the cooling element receiving a second voltage. In some embodiments, the photonic system further includes a controller. The controller is configured to generate a first signal for supplying the first voltage to the heater, and generate a second signal for supplying the second voltage to the cooling element. In some embodiments, the cooling element includes a cooling conductive element, wherein the cooling conductive element overlaps the MRM in a top view. In some embodiments, the heater includes a heater conductive element, wherein the heater conductive element overlaps the MRM in the top view. In some embodiments, the heater conductive element is between the cooling conductive element and the MRM. In some embodiments, the cooling conductive element is between the heater conductive element and the MRM. In some embodiments, the photonic system further includes a substrate, wherein the MRM is on a first side of the substrate, and the heater conductive element is on a second side of the substrate opposite the first side of the substrate. In some embodiments, the waveguide is a curved waveguide. In some embodiments, the photonic system further includes a second waveguide, wherein the MRM is between the waveguide and the second waveguide. In some embodiments, the MRM is configured to couple an optical signal out of the waveguide, and the MRM is configured to couple the optical signal into the second waveguide.

An aspect of this description relates to a photonic system. The photonic system includes a waveguide. The photonic system further includes a micro ring modulator (MRM) spaced from the waveguide. The photonic system further includes a heater configured to increase a temperature of the MRM. The heater includes at least one first doped region, wherein each first doped region of the at least one first doped region has a first dopant type; and at least one second doped region, wherein each second doped region of the at least one second doped region has a second dopant type opposite the first dopant type. The photonic system further includes a cooling element configured to decrease a temperature of the MRM. The cooling element includes a plurality of third doped regions, wherein each third doped region of the plurality of third doped regions has the first dopant type; and a plurality of fourth doped regions, wherein each fourth doped region of the plurality of fourth doped regions has the second dopant type. In some embodiments, the at least one first doped region is a plurality of first doped regions, and adjacent first doped regions of the plurality of first doped regions are discontinuous with one another. In some embodiments, the at least one first doped region directly contacts the MRM. In some embodiments, third doped regions of the plurality of third doped regions and fourth doped regions of the plurality of fourth doped regions are in an alternating pattern arrangement. In some embodiments, a region of the MRM closest to the waveguide is exposed by both the at least one first doped region and the at least one second doped region. In some embodiments, the photonic system further includes a controller, wherein the controller is configured to control a first voltage supplied to the at least one first doped region, and control a second voltage supplied to the plurality of third doped regions. In some embodiments, the photonic system has a slab-free arrangement.

An aspect of this description relates to a method of making a photonic system. The method includes etching a wafer to define a micro ring modulator (MRM) and a plurality of cooling structures. The method further includes doping a first portion of the MRM with a first dopant having a first dopant type. The method further includes doping a second portion of the MRM with a second dopant having a second dopant type different from the first dopant type. The method further includes doping a first cooling structure of the plurality of cooling structures with a third dopant having the first dopant type. The method further includes doping a second cooling structure of the plurality of cooling structures with a fourth dopant having the second dopant type. The method further includes forming a first conductive element proximate the MRM. The method further includes forming a second conductive element electrically connected to the first cooling structure and the second cooling structure. In some embodiments, forming the second conductive element includes forming the second conductive element on an opposite side of the first conductive element from the MRM. In some embodiments, the method further includes depositing a dielectric material over the doped first cooling structure, wherein the dielectric material fills a space between the first cooling structure and the MRM.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A photonic system comprising:
   a waveguide;
   a micro ring modulator (MRM) spaced from the waveguide;
   a heater configured to increase a temperature of the MRM, wherein the heater comprises:
     at least one first doped region, wherein each first doped region of the at least one first doped region has a first dopant type; and
     at least one second doped region, wherein each second doped region of the at least one second doped region has a second dopant type opposite the first dopant type; and
   a cooling element configured to decrease a temperature of the MRM, wherein the cooling element comprises:
     a plurality of third doped regions, wherein each third doped region of the plurality of third doped regions has the first dopant type; and
     a plurality of fourth doped regions, wherein each fourth doped region of the plurality of fourth doped regions has the second dopant type.

2. The photonic system of claim 1, wherein the at least one first doped region is a plurality of first doped regions, and adjacent first doped regions of the plurality of first doped regions are discontinuous with one another.

3. The photonic system of claim 1, wherein the at least one first doped region directly contacts the MRM.

4. The photonic system of claim 1, wherein third doped regions of the plurality of third doped regions and fourth doped regions of the plurality of fourth doped regions are in an alternating pattern arrangement.

5. The photonic system of claim 1, wherein a region of the MRM closest to the waveguide is exposed by both the at least one first doped region and the at least one second doped region.

6. The photonic system of claim 1, further comprising a controller, wherein the controller is configured to:
   control a first voltage supplied to the at least one first doped region, and control a second voltage supplied to the plurality of third doped regions.

7. The photonic system of claim 1, wherein the photonic system has a slab-free arrangement.

8. A photonic system comprising:
   a waveguide;
   a micro ring modulator (MRM) spaced from the waveguide;
   a heater configured to increase a temperature of the MRM in response to receiving a first voltage, wherein the heater comprises:
     at least one first doped region, wherein each first doped region of the at least one first doped region has a first dopant type; and
     at least one second doped region, wherein each second doped region of the at least one second doped region has a second dopant type opposite the first dopant type; and
   a cooling element configured to decrease a temperature of the MRM in response to receiving a second voltage, wherein the cooling element comprises:
     a plurality of third doped regions, wherein each third doped region of the plurality of third doped regions has the first dopant type; and
     a plurality of fourth doped regions, wherein each fourth doped region of the plurality of fourth doped regions has the second dopant type.

9. The photonic system of claim 8, wherein the heater is between the MRM and the cooling element.

10. The photonic system of claim 8, wherein the MRM is between the heater and the cooling element.

* * * * *